US012676825B2

(12) United States Patent
    Kim et al.

(10) Patent No.: US 12,676,825 B2
(45) Date of Patent: Jul. 7, 2026

(54) RECOMMENDING CONTENT

(71) Applicant: KAKAO CORP., Jeju-si (KR)

(72) Inventors: Ji Eun Kim, Seongnam-si (KR); Hyun Jung Kim, Seongnam-si (KR); Chae Eun Lee, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 1 day.

(21) Appl. No.: 18/653,805

(22) Filed: May 2, 2024

(65) Prior Publication Data

US 2024/0372823 A1     Nov. 7, 2024

(30) Foreign Application Priority Data

May 3, 2023     (KR) ........................ 10-2023-0057860

(51) Int. Cl.
    *H04L 51/046*          (2022.01)
(52) U.S. Cl.
    CPC ................................... *H04L 51/046* (2013.01)
(58) Field of Classification Search
    CPC ............... H04L 51/046; G06F 16/9535; G06F 16/9536; G06F 3/0482
    USPC ........................................................ 709/206
    See application file for complete search history.

(56) References Cited

U.S. PATENT DOCUMENTS

|  |  |  |  |  |
|---|---|---|---|---|
| 12,020,174 | B2 * | 6/2024 | Gaskill | ............... G06F 16/3344 |
| 2010/0076867 | A1 * | 3/2010 | Inoue | .................... G06F 16/583 |
|  |  |  |  | 705/347 |

| 2014/0115096 | A1 * | 4/2014 | Burba | ................... H04L 67/535 |
|---|---|---|---|---|
|  |  |  |  | 709/217 |
| 2015/0025996 | A1 * | 1/2015 | Fishman | ............ G06Q 30/0641 |
|  |  |  |  | 705/26.7 |
| 2015/0026015 | A1 * | 1/2015 | Fishman | ............ G06Q 30/0627 |
|  |  |  |  | 705/26.63 |
| 2016/0133091 | A1 * | 5/2016 | Gagner | ............... G07F 17/3244 |
|  |  |  |  | 463/25 |
| 2017/0132693 | A1 * | 5/2017 | Fishman | ............ G06Q 30/0643 |
| 2017/0287027 | A1 * | 10/2017 | Avidor | ............... G06Q 30/0641 |
| 2018/0005288 | A1 * | 1/2018 | Delaney | ............... G06Q 20/102 |
| 2018/0113579 | A1 * | 4/2018 | Johnston | ............ H04N 21/4826 |
| 2018/0218372 | A1 * | 8/2018 | Prendki | ............. G06Q 30/0631 |
| 2019/0130471 | A1 * | 5/2019 | DePizzol | ........... G06Q 30/0641 |
| 2019/0259083 | A1 * | 8/2019 | Hong | .................... H04L 51/046 |
| 2019/0319899 | A1 * | 10/2019 | Dos Santos Marujo | .................... H04L 51/04 |
| 2021/0266275 | A1 * | 8/2021 | Kim | ......................... G09G 5/14 |
| 2021/0382905 | A1 * | 12/2021 | Zimmerman | ..... G06F 16/90324 |

FOREIGN PATENT DOCUMENTS

| KR | 20190095204 | A | 8/2019 | | |
|---|---|---|---|---|---|
| KR | 20190133572 | A | 12/2019 | | |
| KR | 102430904 | B1 | 8/2022 | | |
| WO | WO-2019199977 | A1 * | 10/2019 | ............. | H04L 51/02 |
| WO | WO-2023182559 | A1 * | 9/2023 | ......... | G06F 16/9535 |

* cited by examiner

*Primary Examiner* — Ruolei Zong
(74) *Attorney, Agent, or Firm* — Seed Intellectual Property Law Group LLP

(57)                    ABSTRACT

Recommending content includes obtaining at least one piece of first content published by a first store selected by a user from an online platform, recommending at least one piece of second content that satisfies a selected (or predetermined) condition in response to the obtaining of the at least one piece of first content, and displaying pieces of content including the at least one piece of first content and the at least one piece of second content.

22 Claims, 20 Drawing Sheets

500

| Store that published store board | Company A | | Company S | Company L | Company D |
|---|---|---|---|---|---|
| Target type | Including new friends | | | Including new friends | |
| Category | Digital/Home appliances > Mobile phones/Accessories | | Digital/Home appliances > Mobile phones/Accessories | | |
| Exhibition starting date | January 1, 10 o'clock | | January 2, 10 o'clock | | January 2, 14 o'clock |
| Cumulative views in the last hour | - | | 10 views | 100 views | 100 views |
| Display priority | - | | 2 | 3 | 1 |

Recommended target

| Store that is not Talk channel friend | Up to 3 store boards being exhibited | Store board to be displayed | One with the highest number of views in the last hour | Ranking of views | Major category having purchase history |
|---|---|---|---|---|---|
| A | a-1,a-2,a-3 | a-1 | a-1 | 1 | - |
| B | b-1,b-2,b-3 | b-3 | b-3 | 2 | b-3 |
| C | c-1,c-2,c-3 | c-1,c-2 | c-1 | 3 | - |
| D | d-1,d-2,d-3 | d-2 | d-2 | 4 | - |
| E | e-1,e-2,e-3 | e-2,e-3 | e-3 | 5 | e-3 |
| F | f-1,f-2,f-3 | - | - | | - |
| G | g-1,g-3,g-3 | - | - | | - |

930

Fashion

5:56

Home  Store board · Best  Live  Exhibition — 910

Shopping miel's board

All    Food    Fashion

920

Recommended board for each category

FIG. 9A

1001
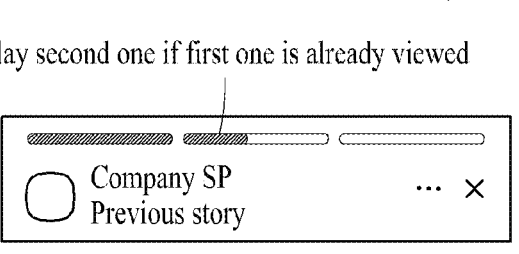
Play second one if first one is already viewed
Previous/next display order :
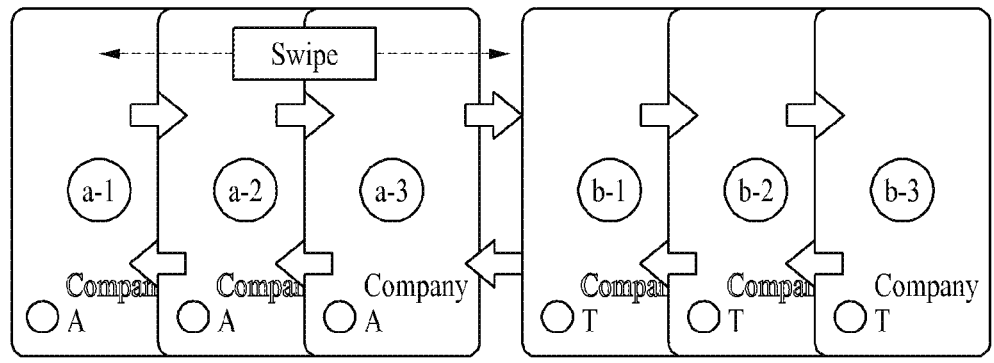
FIG. 10A

1003
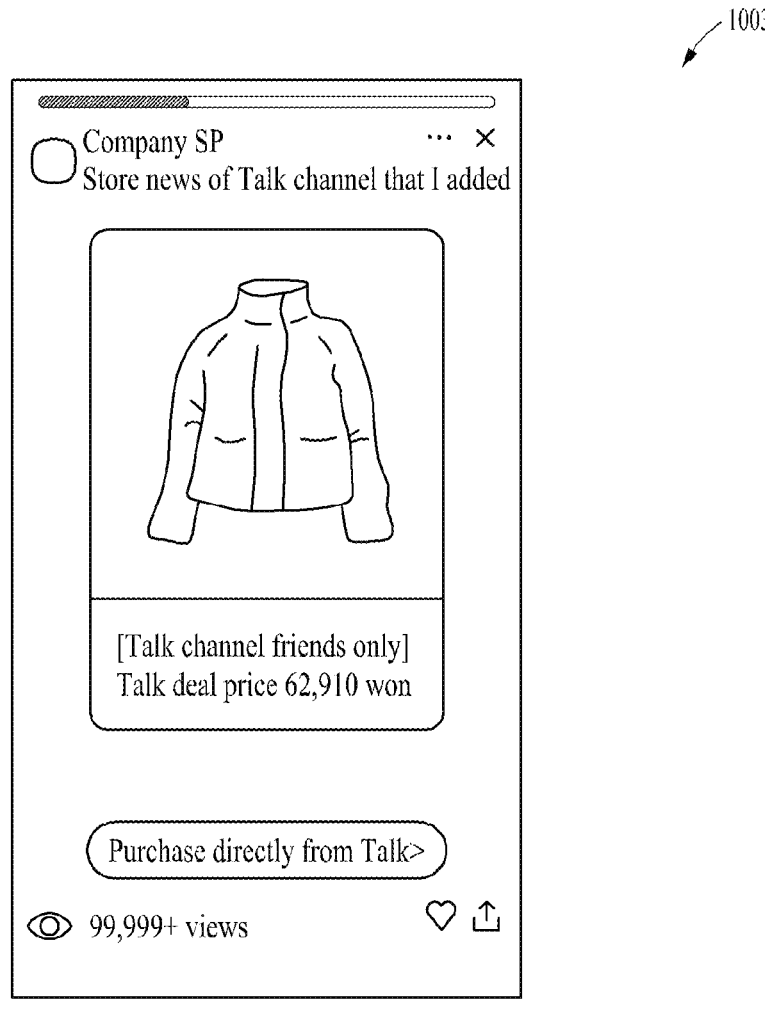
Previous/next display order :
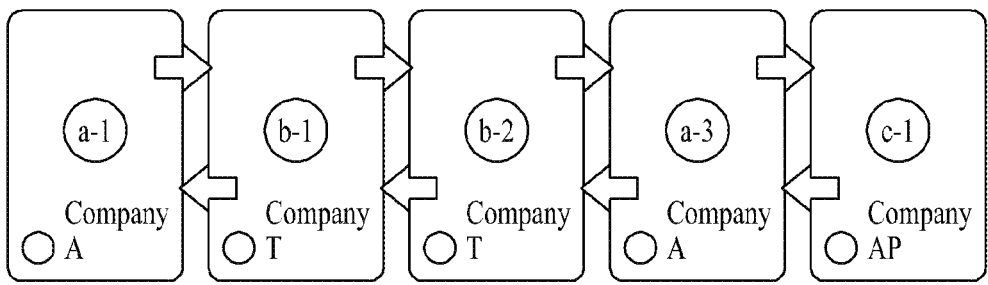
FIG. 10B

RECOMMENDING CONTENT

CROSS-REFERENCE TO RELATED APPLICATIONS

This application claims the benefit of Korean Patent Application No. 10-2023-0057860, filed on May 3, 2023, in the Korean Intellectual Property Office, the entire disclosure of which is incorporated herein by reference for all purposes.

BACKGROUND

Technical Field

One or more embodiments relate to a method and device for recommending content, which are performed by a server interoperating with a messaging server for an instant messaging service (IMS).

Description of the Related Art

Recently, with the development of mobile devices, the use of an online platform service to communicate with other users via a network has increased. An online platform service may generate and strengthen a social relationship through communication, information sharing, and network expansion among users. An online platform service may include an instant messaging service (IMS) for real-time content communication between two or more users. As communication through mobile devices increases, the trend of users purchasing products through online store platforms is also increasing rather than going to stores in person. An online store platform is an e-commerce platform that allows consumers to purchase products or services from sellers through an online communication network. An online store platform may provide sales and purchase services for various types of products and/or services.

BRIEF SUMMARY

Embodiments provide a method of recommending content in a server interoperating with a messaging server for an instant messaging service (IMS).

However, the technical aspects are not limited to the aforementioned aspects, and other technical aspects may be present.

According to an aspect, there is provided a method, performed by a server communicating with a messaging server, of recommending content, the method including obtaining at least one piece of first content published by a first store selected by a user from an online platform, recommending at least one piece of second content that satisfies a selected (or predetermined) condition in response to the obtaining of the at least one piece of first content, and displaying pieces of content including the at least one piece of first content and the at least one piece of second content, in which the selected (or predetermined) condition includes at least one of whether category information of the at least one piece of second content is associated with at least one of the first store and the at least one piece of first content and whether a channel interoperating with each of second stores is a channel included in a friend list of an account of the user in an IMS provided through the messaging server, in which the at least one piece of second content is published by at least one second store among the second stores in the online platform, the displayed pieces of content being displayed on a content screen provided by the online platform that may include at least one of a first area that displays the at least one piece of first content that is being exhibited, a second area that displays an exhibition category of the pieces of content, and a third area that displays at least one of the at least one piece of second content recommended for each of the exhibition category, and new product content, popular content, and coupon content for each of the exhibition category.

The recommending of the at least one piece of second content may include determining, among the second stores, the at least one second store to recommend the at least one piece of second content based on whether the channel interoperating with each of the second stores is the channel included in the friend list of the account of the user in the IMS and determining pieces of third content of the at least one second store to be the at least one piece of second content depending on whether an exhibition category of the pieces of third content of the at least one second store matches the category information associated with at least one of the first store and the at least one piece of first content.

The selected (or predetermined) condition may include at least one of a condition in which the second stores correspond to the same industry as the first store, a condition in which the at least one piece of second content is being exhibited when the at least one piece of first content is displayed, a condition in which exhibition starting dates of the at least one piece of second content take precedence, and a condition in which recent cumulative views of the at least one piece of second content are low.

The determining of the pieces of third content of the at least one second store to be the at least one piece of second content may include determining whether the pieces of third content are preset to be displayed together with the at least one piece of first content and determining the pieces of third content to be the at least one piece of second content by further considering the selected (or predetermined) condition for the pieces of third content according to the determination that the pieces of third content are preset to be displayed together with the at least one piece of first content.

The recommending of the at least one piece of second content may include, depending on whether the at least one piece of second content corresponds to another piece of content published by the first store in addition to the at least one piece of first content, determining the other piece of content to be the at least one piece of second content.

The displaying of the pieces of content may include determining a display priority of the at least one piece of second content according to the latest order of exhibition starting dates of the at least one piece of second content and sequentially displaying the at least one piece of second content according to the determined display priority, following a display of the at least one piece of first content.

The determining of the display priority of the at least one piece of second content may include determining the display priority of the at least one piece of second content based on cumulative views of the at least one piece of second content in a selected (or predetermined) time when the exhibition starting dates of the at least one piece of second content are the same.

The displaying of the pieces of content may include displaying a selected (or predetermined) number of pieces of content for each of the first store and the second stores.

The displaying of the pieces of content may include displaying the at least one piece of first content and the at least one piece of second content for a preset time for each type of the at least one piece of first content and the at least one piece of second content.

The pieces of content may include identification (ID) information related to an exhibition category corresponding to each of the pieces of content.

The displaying of the pieces of content may further include determining content to be displayed in the first area based on at least one of whether the user logs in to the online platform and whether the at least one piece of first content published by the first store exists.

The method may further include differently configuring default category tabs displayed in the second area according to a purchase history of the user.

The displaying of the pieces of content may further include determining a display order of the pieces of content displayed in the first area based on at least one of whether the user subscribes to the online platform, whether the first store is a channel included in the friend list of the account of the user, whether pieces of content that are being exhibited in the first store exist, and whether a number of the pieces of content that is being exhibited is less than or equal to a selected (or predetermined) number and displaying the pieces of content on the content screen according to the determined display order.

The displaying of the pieces of content may include identifying, among pieces of content published by the first store and being exhibited pieces of content not displayed to the user, and sequentially displaying, in the first area, among the identified pieces of content, one or more identified pieces of content having the latest exhibition starting dates.

The recommending of the at least one piece of second content may include determining whether the category information of the at least one piece of second content matches the exhibition category displayed in the second area, extracting, from among the at least one piece of second content, pieces of third content of second stores corresponding to a channel that is not included in the friend list of the account of the user when it is determined that the category information of the at least one piece of second content matches the exhibition category displayed in the second area, filtering undisplayed third content to the user from among the pieces of third content, and recommending the undisplayed third content to the user as the at least one piece of second content to be displayed in the third area.

The displaying of the pieces of content may include determining a display priority of the at least one piece of second content based on whether the category information of the at least one piece of second content belongs to a product category having a purchase history of the user in a selected (or predetermined) period and a ranking of views of the at least one piece of second content for a selected (or predetermined) time and displaying the at least one piece of second content in the third area according to the determined display priority.

The displaying of the pieces of content may include displaying, in the first area of the content screen, the at least one piece of second content according to the oldest order of exhibition starting dates of the pieces of content, following the at least one piece of first content, based on whether the at least one piece of second content is published by the first store.

The displaying of the at least one piece of second content may include preferentially displaying, in the first area of the content screen, undisplayed second content to the user among the at least one piece of second content.

The displaying of the pieces of content may include displaying the pieces of content according to a preset exhibition period by a store corresponding to each of the pieces of content.

The displaying of the pieces of content may include determining whether arbitrary content among the pieces of content corresponds to content set to be dimmed due to a lapse of the preset exhibition period and displaying the arbitrary content regardless of whether the preset exhibition period is ended when the arbitrary content does not correspond to the content set to be dimmed.

According to another aspect, there is provided a method of operating a terminal, the method including displaying a content screen provided by an online platform, in which the content screen includes pieces of content of stores opened in the online platform, transmitting, among the pieces of content displayed in the content screen, information about first content of a first store selected by a user to a server interoperating with a messaging server for an IMS, and displaying pieces of second content recommended by the server in the content screen based on the information, in which the pieces of second content are determined by whether a selected (or predetermined) condition is satisfied, and in which the selected (or predetermined) condition includes at least one of whether category information of at least one piece of second content is associated with at least one of the first store and the first content and whether a channel interoperating with each of second stores is a channel included in a friend list of an account of the user in the IMS provided through the messaging server, in which the at least one piece of second content is published by at least one second store among the second stores in the online platform.

According to still another aspect, there is provided a server for recommending content by communicating with a messaging server, the server including a processor configured to obtain at least one piece of first content published by a first store selected by a user from an online platform, recommend at least one piece of second content that satisfies a selected (or predetermined) condition in response to the obtaining of the at least one piece of first content, and display pieces of content including the at least one piece of first content and the at least one piece of second content, in which the selected (or predetermined) condition includes at least one of whether category information of the at least one piece of second content is associated with at least one of the first store and the at least one piece of first content and whether a channel interoperating with each of second stores is a channel included in a friend list of an account of the user in an IMS provided through the messaging server, in which the at least one piece of second content is published by at least one second store among the second stores in the online platform.

The processor may be configured to determine, among the second stores, the at least one second store to recommend the at least one piece of second content based on whether a channel interoperating with each of the second stores is the channel included in the friend list of the account of the user in the IMS and determine pieces of third content of the at least one second store to be the at least one piece of second content depending on whether an exhibition category of the pieces of third content of the at least one second store matches the category information associated with at least one of the first store and the at least one piece of first content.

According to yet another aspect, there is provided one or more memories collectively having contents configured to cause a server communicating with a messaging server to perform a method of recommending content, the method including obtaining at least one piece of first content published by a first store selected by a user from an online platform, recommending at least one piece of second content that satisfies a selected (or predetermined) condition in response to the obtaining of the at least one piece of first content, and displaying pieces of content including the at least one piece of first content and the at least one piece of second content, in which the selected (or predetermined) condition includes at least one of whether category information of the at least one piece of second content is associated with at least one of the first store and the at least one piece of first content and whether a channel interoperating with each of second stores is a channel included in a friend list of an account of the user in an IMS provided through the messaging server, in which the at least one piece of second content is published by at least one second store among the second stores in the online platform, the displayed process of content being displayed or a content screen provided by the online platform may include at least one of a first area that displays the at least one piece of first content that is being exhibited, a second area that displays an exhibition category of the pieces of content, and a third area that displays at least one of the at least one piece of second content recommended for each of the exhibition category, and new product content, popular content, and coupon content for each of the exhibition category.

Additional aspects of embodiments will be set forth in part in the description which follows and, in part, will be apparent from the description, or may be learned by practice of the disclosure.

BRIEF DESCRIPTION OF THE SEVERAL VIEWS OF THE DRAWINGS

These and/or other aspects, features, and advantages of the disclosure will become apparent and more readily appreciated from the following description of embodiments, taken in conjunction with the accompanying drawings of which:

FIG. 5 is a diagram illustrating a method of recommending at least one piece of second content, according to an embodiment;

FIGS. 9A and 9B are diagrams illustrating a method of recommending at least one piece of second content to be displayed in a third area of a store board screen, according to an embodiment;

FIGS. 10A to 10C are diagrams illustrating a method of displaying one piece of content or a group of pieces of content for each area of a store board screen, according to an embodiment;

DETAILED DESCRIPTION

Figure 1:
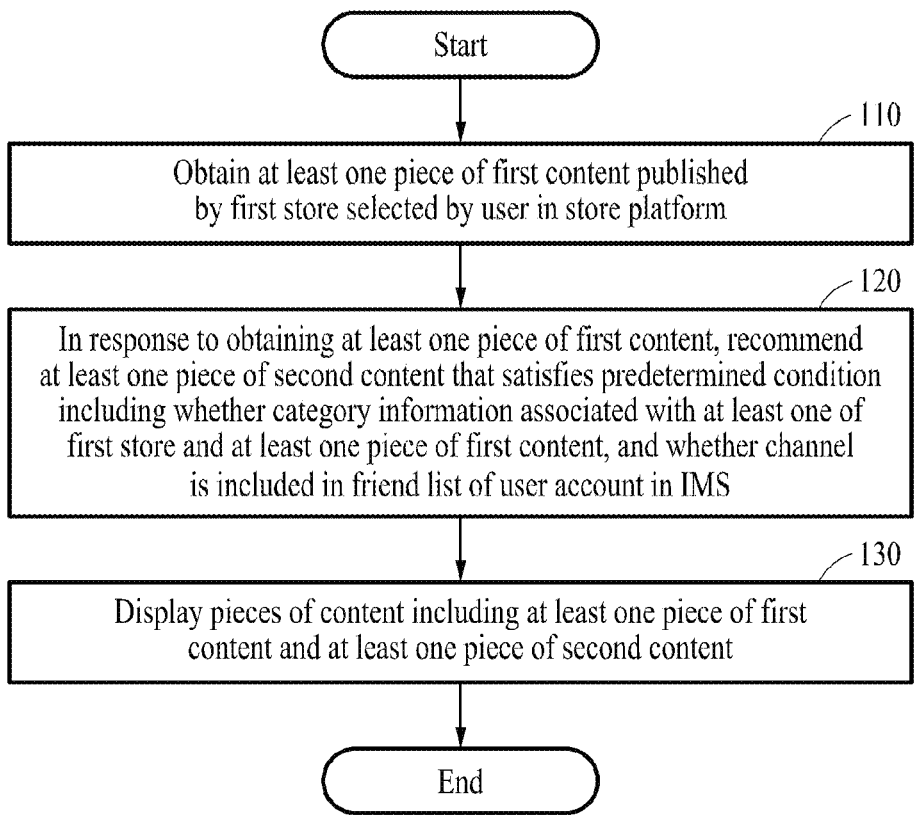
FIG. 1 is a flowchart illustrating a method of recommending content, according to an embodiment.

The following structural or functional descriptions of embodiments described herein are merely intended for the purpose of describing the embodiments described herein and may be implemented in various forms. Accordingly, the embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, or similarly, the second component may be referred to as the first component.

It should be noted that if it is described that one component is "connected," "coupled," or "joined" to another component, a third component may be "connected," "coupled," and "joined" between the first and second components, although the first component may be directly connected, coupled, or joined to the second component.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, the embodiments will be described in detail with reference to the accompanying drawings. When describing the embodiments with reference to the accompanying drawings, like reference numerals refer to like elements and a repeated description related thereto will be omitted.

FIG. 1 is a flowchart illustrating a method of recommending content, according to an embodiment. Operations to be described hereinafter may be performed sequentially but not necessarily. For example, the order of the operations may change and at least two of the operations may be performed in parallel.

FIG. 1 illustrates a method of recommending content by a server for a store platform, according to an embodiment. The server may interoperate with a messaging server. The 'messaging server' is a server that provides an instant messaging service (IMS) and may interoperate with an instant messenger executed by a terminal of a user for a user interface (UI), a function, an operation, or a service. The instant messenger may correspond to an instant messenger application installed on the terminal of the user and providing a function of sending and receiving instant messages between two or more users including the user and/or an instant messenger web. The 'IMS' may include a service that allows a plurality of users to chat in real time by sending instant messages, such as a text message, a voice message, a media file, and the like, through a network in real time, such as wireless Internet or a wireless communication network, and a service related thereto. The instant messenger application may provide a UI to the terminal of the user in which the instant messenger application is installed. The terminal of the user may perform operations of configuring a screen for sending and receiving instant messages, inputting data, transmitting and receiving data, and storing data through a UI provided by the instant messenger application.

A terminal may be, for example, at least one of electronic devices such as a computer, a portable computer, a wireless phone, a mobile phone, a smartphone, a personal digital assistant (PDA), a web tablet, and the like. The terminal of the user may include a display and may refer to any device capable of installing and executing an application (e.g., the instant messenger application).

The instant messenger provided by the messaging server may drive the terminal. The user may use the IMS provided by the messaging server by executing the instant messenger in the terminal. The user may create a user account by subscribing to the IMS through the instant messenger. The user may use the IMS through the terminal logged in with the user account subscribing to the IMS.

A screen of the IMS according to an embodiment may include at least one of, for example, a friend list screen, a chat room list screen, a chat room screen, a shopping screen, a channel screen, and a store board screen. The 'chat room' may refer to a virtual space for sending and receiving chat messages in which one or more user accounts participate. The chat room may be created by executing the IMS, and for example, the chat room may be created by a request from the user to open a chat room received from the server through the instant messenger. For example, the user may participate in a chat room through a user account that requests the opening of the chat room or a user account invited by a user account that is already participating in the chat room or may participate in the chat room through a link.

As described in more detail below, a plurality of channels may be displayed on the screen of the IMS according to an embodiment. Through the plurality of channels displayed on the screen, the user may easily access a product view, even when the user views various screens.

In operation 110, the server may obtain at least one piece of first content published by a first store that is selected by the user in the store platform. The term 'store platform' described herein may also be referred to as an 'online store platform' or an 'online platform.' The online platform may include, for example, but is not necessarily limited thereto, various third-party commerce platforms.

For example, in the IMS, a business friend included in a friend list of the user account or a business friend list may have a store opened in the store platform. In this case, the server may identify whether a corresponding business account has a friend relationship with the user in the messaging platform, using a business account of the business friend. Here, 'the business account has a friend relationship with the user' may be understood as that a friend relationship is established between the user account and the business account of the business friend in the IMS. The server may identify whether the business friend having a friend relationship with the user has a first store launched (opened) in the store platform and may extract at least one piece of first content published by the first store, so that the server may provide the at least one piece of first content to the user. The server may obtain the at least one piece of first content published by the first store selected by the user among first stores displayed through a content screen (e.g., a content screen 230 of FIG. 2, store board screens 710 and 730 of FIGS. 7A and 7B, and a store board screen 810 of FIG. 8) provided by the store platform. Here, the content screen provided by the store platform may be displayed through the IMS (e.g., a Kakao Talk channel). In an embodiment, when a corresponding store (e.g., the first store) is opened in the 'store platform' and is also opened in a service platform (e.g., a Kakao Talk channel) for the IMS, content (e.g., a store board) provided by the store platform may correspond to content that may be published only when interoperating is completed between these two platforms. Here, a channel that the user follows is a 'Kakao Talk channel,' and a 'store' and the 'Kakao Talk channel' interoperate with each other, and based on whether the user has a friend relationship with the 'Kakao Talk channel' (e.g., a Talk channel subscription) interoperating with the 'store,' content displayed in a recommendation area of the content screen may vary.

The at least one piece of first content may be stored in the store platform or the messaging platform but is not necessarily limited thereto.

Figure 2:
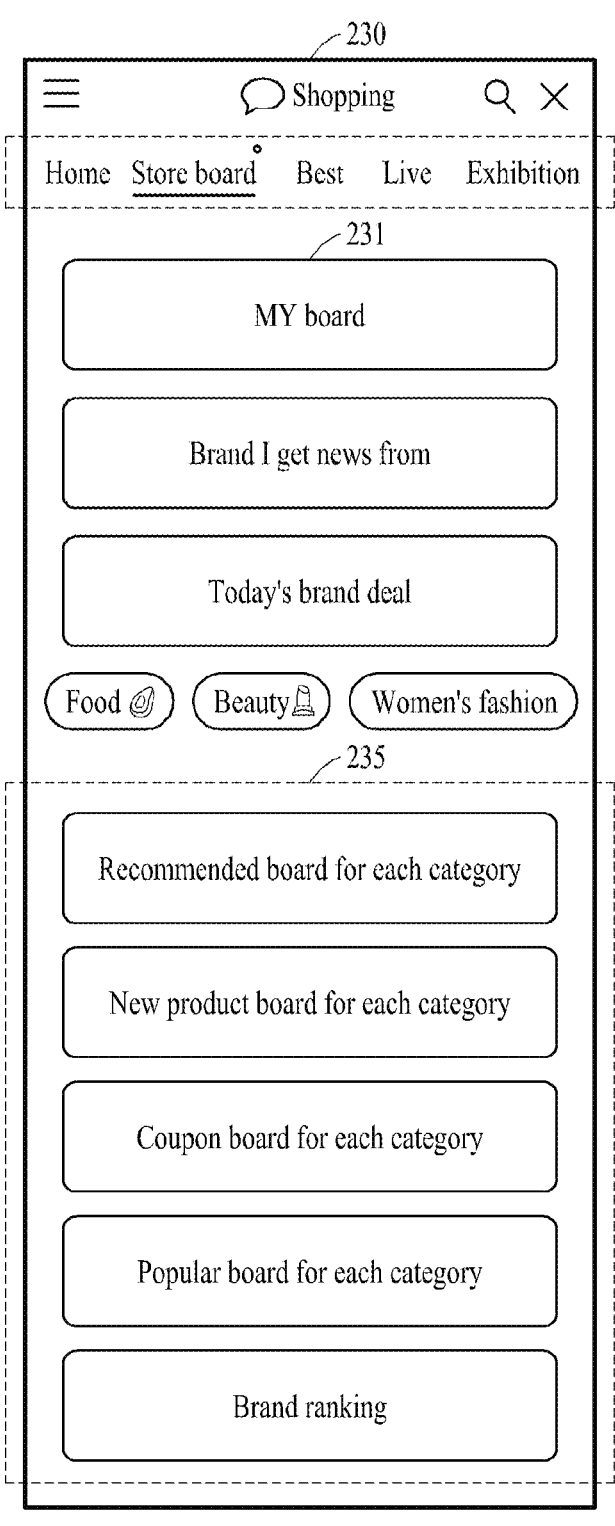
FIG. 2 is a diagram illustrating a content screen provided to an instant messaging service (IMS) through a store platform provided based on a channel, according to an embodiment.
Figure 7A:
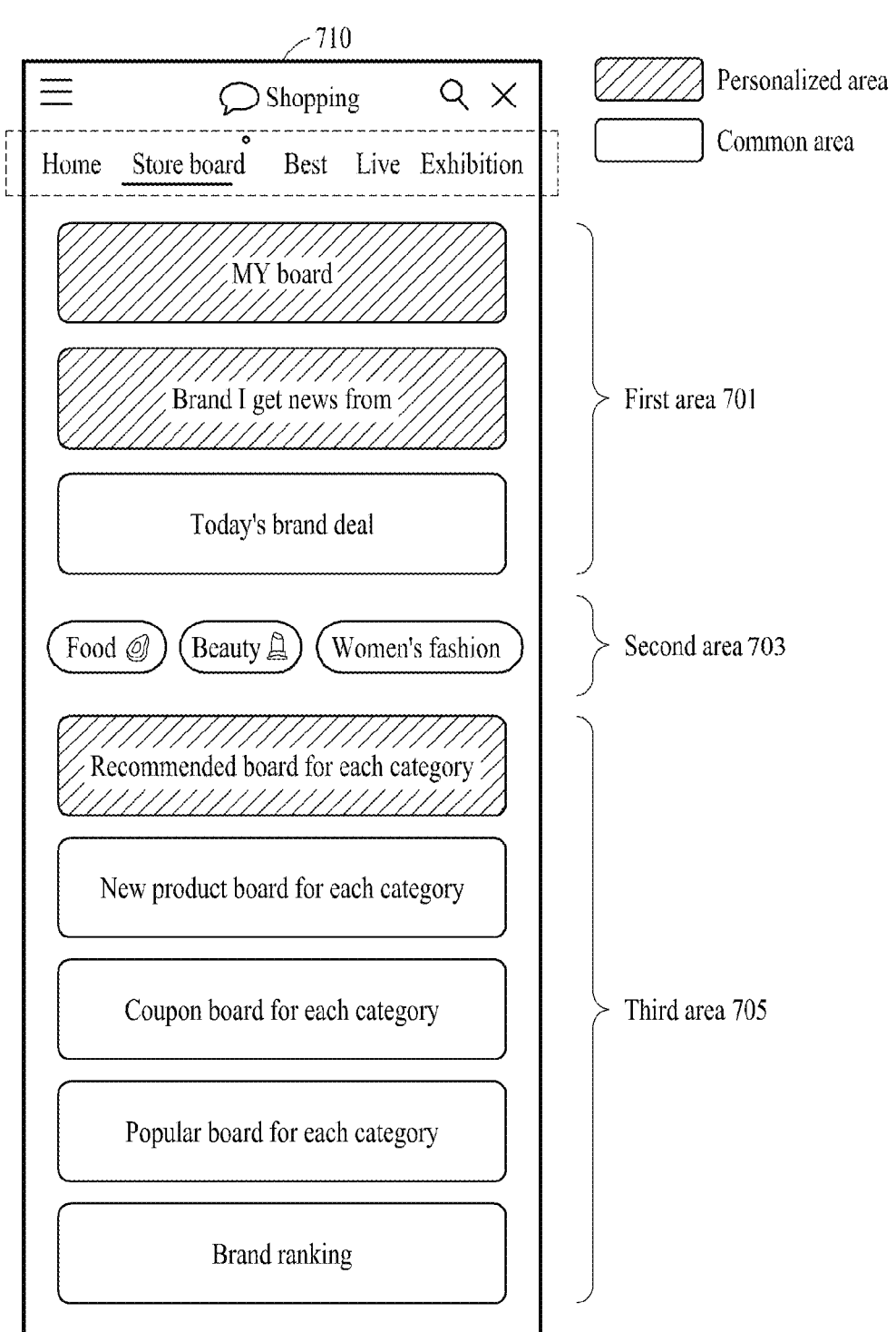
FIGS. 7A and 7B are diagrams illustrating an example of a configuration of a store board screen provided through a store platform, according to an embodiment.

Here, the "obtaining of the at least one piece of first content published by the first store and selected by the user in the store platform," for example, may refer to a situation in which the at least one piece of first content published by the first store or a representative image of the at least one piece of first content is displayed in a selected (or predetermined) area of the content screen provided by the store platform, such as the content screen 230 of FIG. 2 or the store board screen 710 of FIG. 7A, and the user selects the at least one piece of first content or the representative image of the at least one piece of first content. The content screen is described in more detail below with reference to FIGS. 2 and/or 7A.

The server according to an embodiment may be a store platform server that provides a store platform service providing a product sales service. The server may interoperate with the instance messaging server and may provide the product sales service through a shopping screen or a shopping tab screen in the IMS. Depending on an embodiment, the server may include the instant messaging server that processes sending and receiving general messages between accounts registered in the messaging platform and the store platform server that provides the product sales service through the store platform. In addition, the server may include one or more modules, and each module may be implemented to perform operations related to services for displaying recommended pieces of content and transmitting the recommended pieces of content through chat messages in addition to an operation of recommending pieces of content to be displayed in the store platform.

The IMS may provide various types of accounts such as a personal account, a business account, or a service account. The personal account may be an account for a general user, the business account may be an account for a certain business, and the service account may be an account for a certain service. The business account and the service account may be referred to as a 'channel.' Alternatively, the 'channel' may be a seller account registered in the store platform. The seller account may be, for example, a business account.

Herein, the 'store' may refer to a store(s) of a business friend who opens a store in the store platform. Hereinafter, for example, the 'first store' is a store that the user frequently visits through operations of a 'wish' or 'a registration as an interested store,' and among stores of the business friend that the user directly selects and follows, the 'store' may correspond to a store that the user selects to view at least one piece of first content. A 'second store(s)' may correspond to a store that is not included in the friend list of the user account, that is, a store(s) that the user does not follow. Here, the friend list of the user account may include the business friend list. The second store may correspond to a store that is opened in the store platform but not registered as an interested store by the user or a store that the user does not follow.

Herein, the 'content' may correspond to a post published by a store opened in the store platform to promote a product and/or an event related to the store. The content may be manufactured in the form of, for example, text, symbols, voices, sounds, images, videos, and/or moving images. The content may also be referred to as a 'board' or a 'store board' in that the content is a post published by a store. Hereinafter, the terms 'content,' 'board,' and 'store board' may be used interchangeably. 'At least one piece of first content' may refer to content published by the first store. In addition, 'pieces of second content' described below may refer to content that satisfies a selected (or predetermined) condition (e.g., whether category information of the pieces of second content matches category information of at least one of the first store and the at least one piece of first content or whether the pieces of second content are channels included in the friend list of the user account in the IMS) associated with at least one of the first store and the at least one piece of first content. Here, 'the category information of the pieces of second content matches the category information of at least one of the first store and the at least one piece of first content' may be understood as that the pieces of second content correspond to the same industry as the first store or correspond to the same exhibition category as a product promoted through the at least one piece of first content. Additionally, 'whether the pieces of second content are channels included in the friend list of the user account in the IMS' may be understood as whether a friend relationship is established between the user account and the business account of the first store.

In addition, the selected (or predetermined) condition may include, for example, a condition in which second stores correspond to the same industry as the first store, a condition in which an exhibition period of at least one piece of second content is not ended when at least one piece of first content is displayed, that is, a condition in which the at least one piece of second content is being exhibited, a condition in which an exhibition starting date of the at least one piece of second content takes precedence, and a condition in which the recent accumulated views of the at least one piece of second content are low (or high).

'Pieces of third content' may correspond to pieces of content published by a second store(s) corresponding to a channel that is not included in the friend list (the business friend list) of the user account in the IMS. Pieces of second content may include at least one piece of first content that the user has not yet viewed among the at least one piece of first content and/or pieces of third content published by a second store(s) that the user does not follow. Pieces of content may include, for example, but are not necessarily limited thereto, at least one type of a single image (a still image) and a moving image. Pieces of content may be group content including pieces of content (e.g., 3 pieces of content) or may be one piece of single content.

A process of publishing content according to an embodiment is as follows. A seller may register the publication of content in the store platform (more specifically, a seller center of the store platform). The seller center may review the content. As the review is completed, the server may publish the content by automatically displaying the content for each area on the content screen according to an exhibition period set corresponding to the content.

The 'exhibition period' may refer to a period during which content is exhibited (displayed) through a certain screen of the store platform. For example, the exhibition period may be set directly by the user, or a certain period may be automatically set.

Status information corresponding to content may be determined depending on whether a review corresponding to the content is in progress and/or whether an exhibition period has elapsed. For example, when content A is being reviewed, the review is rejected, or the content A is being reviewed again, the server may set status information of the content A to a 'temporary save' status. Alternatively, when an exhibition period of the content A has not yet arrived, the server may set the status information of the content A to a 'waiting for an exhibition' status. When the exhibition period of the content A arrives, the server may set the status information of the content A to an 'on exhibit' status. Additionally, when the exhibition period of the content A is ended, the server may set the status information of the content A to an 'exhibition ended' status. In addition, when the content A corresponds to content set to be dimmed due to the lapse of the preset exhibition period, the server may set the status information of the content A to a 'dimmed' status as the exhibition period of the content A is ended. Whether to change the status of the content A to the dimmed status as the exhibition period is ended may be set, for example, by a seller or a manager of a store promoting the content A.

Content of which an exhibition period is ended may only be displayed in a certain area (e.g., MY board area) corresponding to the user in the store platform. A certain number of pieces of content (e.g., up to 3 pieces of content) may be published for each store. The server may display content published by a store for a preset period (e.g., up to 72 hours).

For example, even after an exhibition period of content is ended, the user may view the content through screens such as a store board screen of the store platform and/or a wish list screen of the user, but the content may not be displayed on a screen other than a home screen or the wish list screen of the user.

For example, when status information of content is a 'dimmed' status, the content may not be displayed on the shopping screen of the IMS in addition to the shopping home screen and the shopping tab screen of the store platform. In addition, when status information of content is a 'dimmed' status, a phrase, such as 'This content is no longer displayed,' may be output to a user who enters the store platform through a link. A process of publishing content is described in more detail below with reference to FIGS. 4A and 4B.

In operation 120, the server may recommend at least one piece of second content that satisfies a selected (or predetermined) condition in response to obtaining at least one piece of first content. The selected (or predetermined) condition may include at least one of whether category information of the at least one piece of second content is associated with at least one of a first store and the at least one piece of first content, and whether a channel interoperating with each of second stores is a channel included in the friend list of the user account in the IMS provided through the messaging server. Here, the at least one piece of second content may be published by at least one second store among the second stores in the online platform. The server may determine whether pieces of third content of the second stores satisfy the selected (or predetermined) condition.

For example, the server may determine, among the second stores, the at least one second store to recommend the at least one piece of second content based on whether a channel corresponding to the second stores is a channel included in the friend list of the user account in the IMS. The server may determine pieces of third content of the at least one second store to be the at least one piece of second content depending on whether an exhibition category of the pieces of third content of the at least one second store matches the category information associated with at least one of the first store and the at least one piece of first content.

In addition, the server may determine whether the pieces of third content are preset to be displayed together with the at least one piece of first content. For example, as shown in a setting screen 430 of FIG. 4B, when the user selects "new friends" as a target type, content of the new friends (business friends), that is, the pieces of third content of the second stores, may be displayed together with the at least one piece of first content of existing friends (business friends). When "new friends" are set as a target type, the server may determine to display the pieces of third content together with the at least one piece of first content. When the pieces of third content are set to be displayed together with the at least one piece of first content, the server may determine whether the pieces of third content satisfy a selected (or predetermined) condition. The 'selected (or predetermined) condition' may be a condition that determines third content to be displayed together with the at least one piece of first content. The selected (or predetermined) condition may include, but is not necessarily limited thereto, a condition in which the category information of the pieces of third content matches the category information associated with at least one of the first store and the at least one piece of first content (e.g., a condition in which the second stores correspond to the same industry as the first store and/or a condition in which a product promoted through pieces of third content corresponds to the same exhibition category as a product promoted through the at least one piece of first content), a condition in which the second stores are stores corresponding to the channel included in the friend list of the user account in the IMS, a condition in which at least one piece of second content is being exhibited when the at least one piece of first content is displayed, a condition in which an exhibition starting date of the at least one piece of second content takes precedence, and a condition in which the recent accumulative views of the at least one piece of second content are low (or high).

When the pieces of third content satisfy the selected (or predetermined) condition, the server may determine the pieces of third content to be the at least one piece of second content and recommend the at least one piece of second content. Here, pieces of content may include identification (ID) information related to an exhibition category corresponding to each of the pieces of content. The 'exhibition category' is a concept distinguished from a product category described below and may correspond to a major classification of products exhibited through the store platform. The exhibition category may include, for example, but is not necessarily limited thereto, categories such as food, beauty, fashion, sports/leisure, childbirth/childhood, living/interiors, and digital/home appliances.

Additionally, the server may determine other pieces of content to be the at least one piece of second content and recommend the at least one piece of second content based on whether the at least one piece of second content corresponds to other pieces of content published by the first store in addition to the at least one piece of first content. In addition to the at least one piece of first content, the server may determine, among other pieces of content published by the first store, pieces of content that have not yet been displayed to the user to be the at least one piece of second content to be displayed together with the at least one piece of first content and may recommend the at least one piece of second content. A method in which the server recommends the at least one piece of second content is described in more detail below with reference to FIGS. 3, 5, and 6.

In operation 130, the server may display pieces of content including the at least one piece of first content received in operation 110 and the at least one piece of second content recommended in operation 120. The server may display the pieces of content through the content screen (e.g., a store board screen of FIGS. 7A and 7B) of the store platform.

The server may determine a display priority of at least one piece of second content according to the latest order of exhibition starting dates of the at least one piece of second content. When the exhibition starting dates of the at least one piece of second content are the same, the server may determine the display priority of the at least one piece of second content based on the cumulative views of the at least one piece of second content in a selected (or predetermined) time (e.g., the last hour). For example, the server may determine the display priority of second content according to the order in which the cumulative views are low. The server may sequentially display the at least one piece of second content according to the determined display priority, following a display of at least one piece of first content.

In addition, the server may display a selected (or predetermined) number of pieces of content (e.g., 3 pieces of content) for each of the first store and second stores. The server may display three pieces of video content for each store. For example, when there are a plurality of first stores and a plurality of second stores, the server may display 3 pieces of video content corresponding to each of the plurality of first stores and 3 pieces of video content corresponding to each of the plurality of second stores.

The server may display at least one piece of first content and at least one piece of second content for a preset time for each type of the at least one piece of first content and the at least one piece of second content. For example, when the type of content (the at least one piece of first content and/or the at least one piece of second content) is a single image (a still image), the server may display a corresponding content for 10 seconds per content, and when the type of content is a moving image, the server may display a corresponding content for up to 60 seconds per content, but embodiments are not necessarily limited thereto.

The content screen provided by the store platform may include, for example, a first area that displays at least one piece of first content that is being exhibited, a second area that displays an exhibition category of pieces of content, and a third area that displays at least one of at least one piece of second content recommended for each exhibition category, and new product content (e.g., a new product board), popular content (e.g., a popular board), and coupon content (e.g., a coupon board) for each exhibition category. The first area may be referred to as "MY board area." The second area may be referred to as a "category tab area." The third area may be referred to as a "tab sub-content display area." An example of a configuration of the content screen is described in more detail below with reference to FIGS. 7A and 7B.

In addition, for example, the server may display pieces of content in the first area of the content screen provided by the store platform according to a preset exhibition period by a store corresponding to the pieces of content. The server may determine whether arbitrary content among the pieces of content corresponds to content set to be dimmed due to the lapse of the preset exhibition period. When the arbitrary content does not correspond to the content set to be dimmed, the server may display the arbitrary content regardless of whether the preset exhibition period is ended. When the arbitrary content corresponds to the content set to be dimmed, the server may dim the arbitrary content as the preset exhibition period is ended. A method of displaying content according to whether the content is set to be dimmed is described in more detail below with reference to FIGS. 11B and 11C.

FIG. 2 is a diagram illustrating a content screen provided to the IMS through the store platform provided based on a channel, according to an embodiment. FIG. 2 illustrates an example of a configuration of the content screen 230 according to an embodiment.

The content screen 230 may include a personalized area 231 that displays content and/or stores that the user follows and a common area 235 that displays content and/or stores that the user does not follow.

The personalized area 231 may correspond to an area that displays content, in which whether to display the content may be determined based on personal information such as content that the user follows or favorite stores of the user. The personalized area 231 may be referred to as, for example, "MY board" area. Here, the 'content and/or stores that the user follows' may refer to content corresponding to a channel of a business friend added to the friend list of the user account by the user and/or stores opened in the store platform by a business friend of which a channel is added to the friend list of the user account by the user. In addition, the 'content and/or stores that the user does not follow' may refer to content corresponding to a channel of a business friend that is not added to the friend list of the user account by the user and/or stores opened in the store platform by a business friend of which a channel is not added to the friend list of the user account by the user. The personalized area 231 may include an area (e.g., "brand I get news from") that displays content (e.g., a store board) of a store that the user follows and an area that displays a store that the user has recently followed.

When the user selects the personalized area 231 of the content screen 230 by clicking or double-clicking, a detailed view of content (a store board) of a store that the user follows may be displayed in the personalized area 231.

The common area 235 may correspond to an area that commonly displays content and/or stores recommended by the server. For example, a "recommended board for each category," a "new product board for each category," a "coupon board for each category," a "popular board for each category," a "latest board for each category," and a "brand ranking for each category" may be displayed in the common area 235. For example, the "popular board for each category" may display the same slot as the shopping tab, and a ranking of N most popular pieces of content may be displayed for each category at the bottom. In addition, for example, up to M latest pieces of content (store boards) may be displayed in the "latest board for each category." When the user selects various sub-boards (e.g., a popular board with a coupon attached, the latest board for each category, a recommended & popular board for each category, and a popular store (a sales ranking) for each category) of stores displayed in the common area 235 of the content screen 230, the popular board for each category and the latest board for each category may be displayed in the common area 235 of the content screen 230 together with tabs of categories corresponding to stores that the user does not follow. The common area 235 may correspond to another store area that the user does not know.

At least one piece of second content recommended through the process described above with reference to FIG. 1 may be displayed, for example, in the personalized area 231 of the content screen 230, but embodiments are not necessarily limited thereto.

Figure 3:
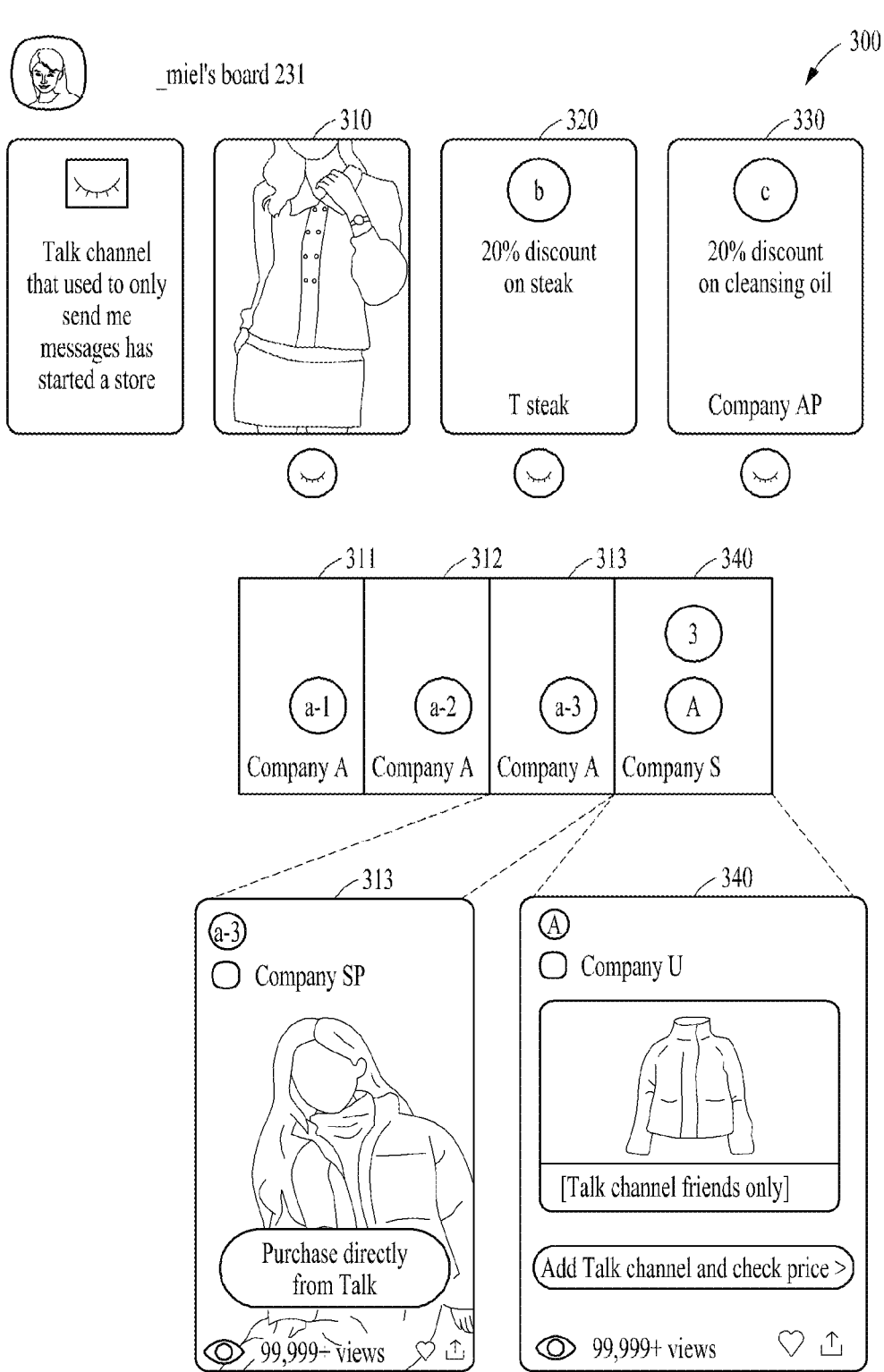
FIG. 3 is a diagram illustrating a method of recommending at least one piece of second content, according to an embodiment.

FIG. 3 is a diagram illustrating a method of recommending at least one piece of second content, according to an embodiment. According to an embodiment, FIG. 3 illustrates, among first stores (e.g., store a 310, store b 320, and store c 330) displayed in the personalized area 231 of the content screen 230, a diagram 300 showing a situation in which at least one piece of second content that satisfies a selected (or predetermined) condition associated with pieces of first content (e.g., a-1 content 311, a-2 content 312, and a-3 content 313) published by the store a 310 is recommended as the user selects the store a 310.

The store a 310 may correspond to company A, the store b 320 may correspond to T steak, and the store c 330 may correspond to company AP. The store a 310, the store b 320, and the store c 330 may all correspond to stores corresponding to a channel included in the business friend list of the user account in the IMS, that is, stores that the user follows.

For example, it may be assumed that the user views the a-3 content 313 in detail among the pieces of first content (e.g., the a-1 content 311, the a-2 content 312, and the a-3 content 313). Here, when the pieces of first content (e.g., the a-1 content 311, the a-2 content 312, and the a-3 content 313) correspond to group content, the pieces of first content may have the same exhibition category.

In this case, the server may select second content having the same exhibition category as the a-3 content 313. For example, it may be assumed that the major classification of the exhibition category of the a-3 content 313 is 'fashion' and the detailed classification is 'women's clothing.' Hereinafter, for case of description, the major classification and the detailed classification of the exhibition category of the a-3 content 313 may be briefly displayed in the form of "major classification (e.g., fashion)>detailed classification (e.g., women's clothing)."

The server may select, among pieces of content of which the exhibition category is "fashion>women's clothing," pieces of third content of store A of company S that the user does not follow.

Among the pieces of third content, the server may search for content of which a current exhibition period is not ended, that is, content of which status information is an 'on exhibition' status. Among the pieces of content of which status information is an 'on exhibition' status, the server may display content (e.g., content 340) in which the cumulative views are low in a selected (or predetermined) time (e.g., the last hour), following the a-3 content 313.

In an embodiment, each piece of content may include information including a target type, category information (e.g., an exhibition category), and/or an exhibition period set by a seller during a process of publishing content. The server may search for and select content that satisfies a selected (or predetermined) condition through information corresponding to each piece of content. Hereinafter, before describing a more detailed method of recommending content, a process of publishing content is first described below with reference to FIGS. 4A and 4B.

Figure 4A:
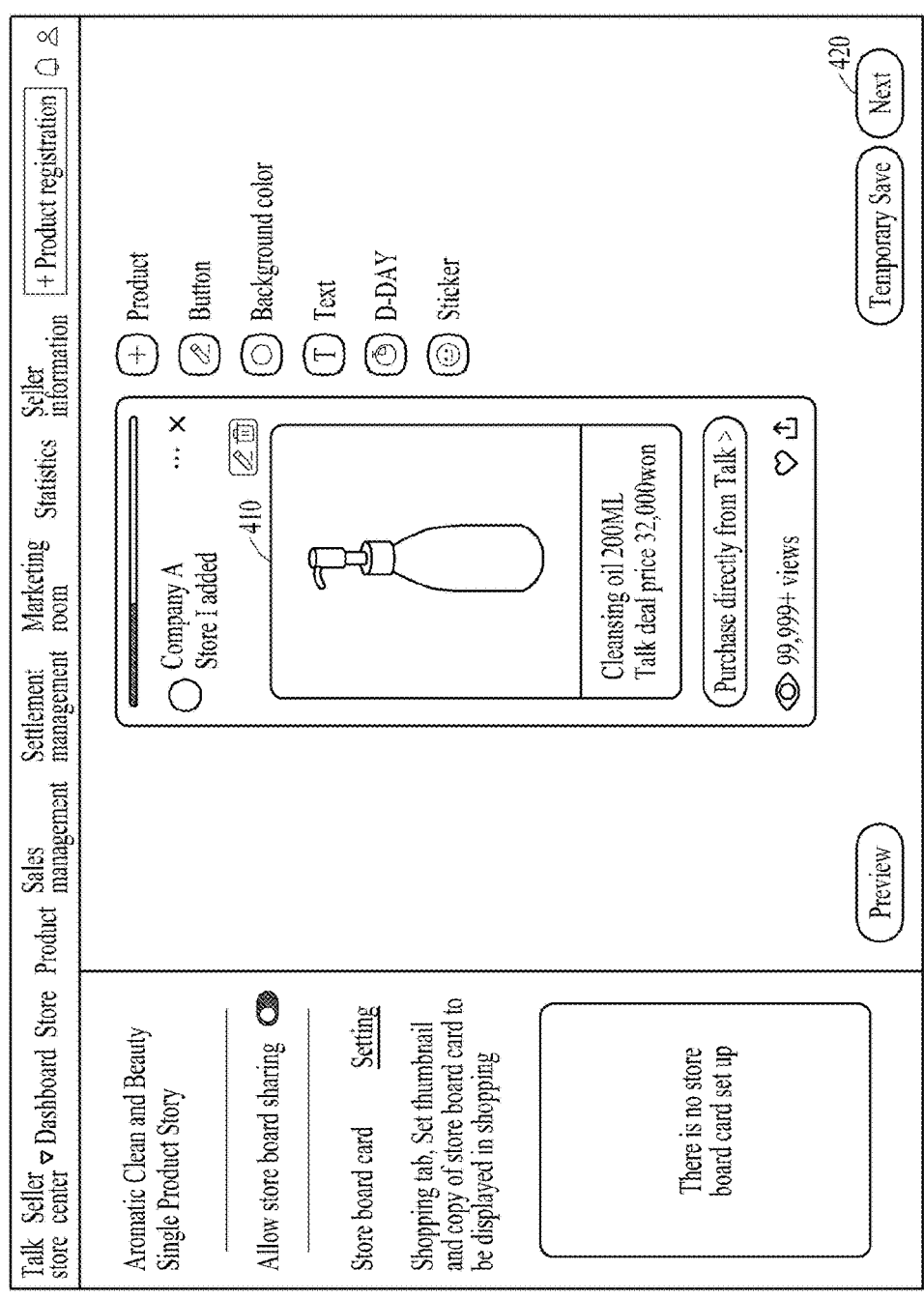
FIGS. 4A and 4B are diagrams illustrating a process of publishing content, according to an embodiment.
Figure 4B:
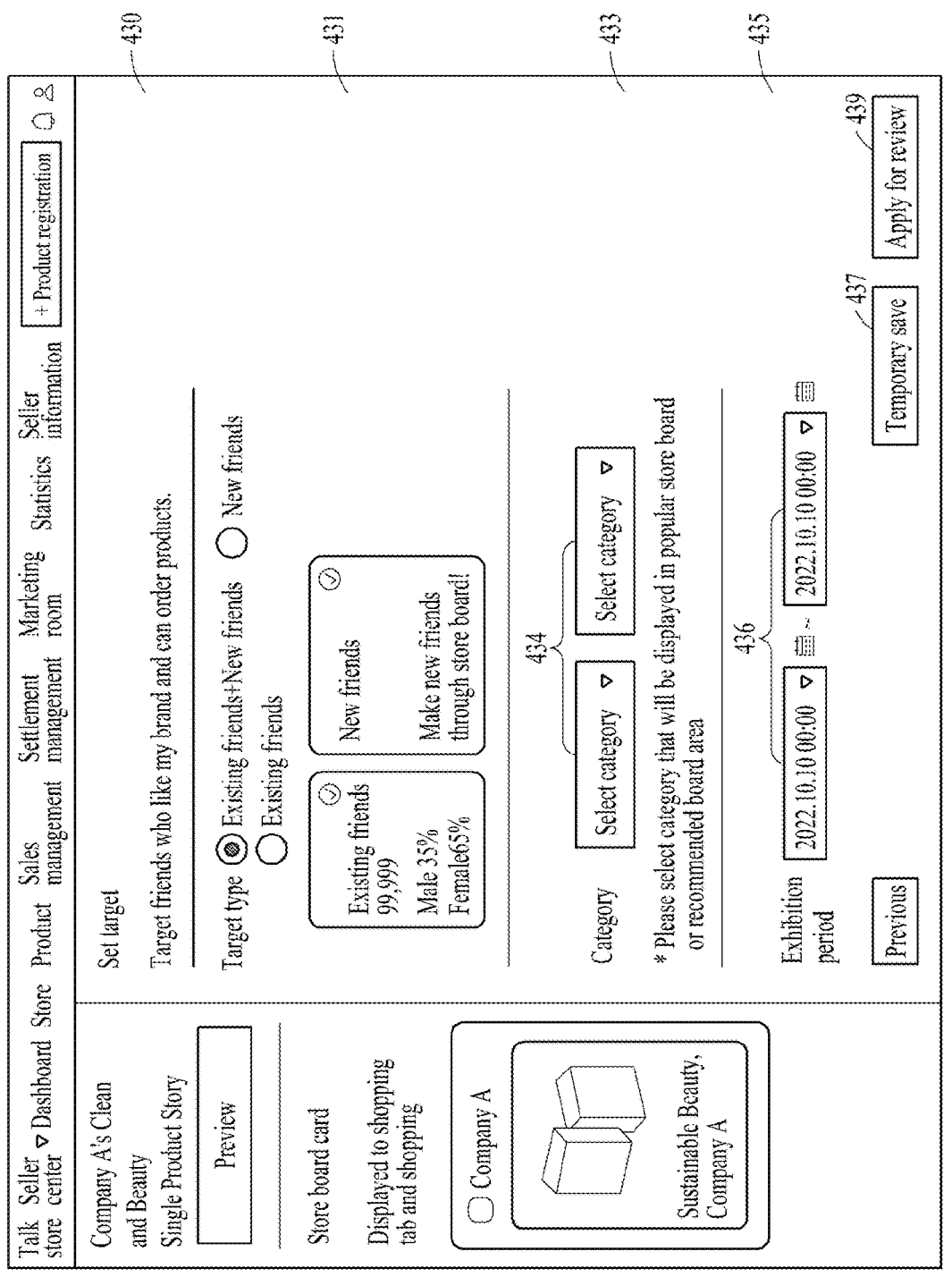

FIGS. 4A and 4B are diagrams illustrating a process of publishing content, according to an embodiment. FIG. 4A illustrates a screen 400 for registering the publication of content 410 through the store platform, according to an embodiment, and FIG. 4B illustrates the setting screen 430 for publishing content.

For example, when a seller selects the content 410 to be registered in the store platform and then selects an interfacing object (e.g., a 'next' button 420) displayed on the screen 400, the setting screen 430 for publishing content may be provided, as shown in FIG. 4B.

The setting screen 430 may include a target type to publish the content 410, that is, a target setting area 431 that sets a target type to display the content 410, a category setting area 433 that sets a category corresponding to the content 410, and an exhibition period setting area 435 that sets an exhibition period of the content 410.

Three types of targets, for example, "a first type (existing friends+new friends)," "a second type (new friends)," and "a third type (existing friends)" may be displayed in the target setting area 431. Content displayed through the content screen may vary depending on the target type selected or set by the seller in the target setting area 431.

For example, when the seller sets a target type corresponding to the content 410 to the first type, the content 410 may be displayed on a content screen targeting both the existing friends and the new friends. Here, the 'existing friends' may correspond to business friends included in the friend list of the user account in the IMS. The 'new friends' may correspond to business friends that are not included in the friend list of the user account in the IMS.

When a target type is set to the first type, the content 410 may be displayed on all content screens of the IMS platform in addition to the store platform. In this case, the content 410 may be provided as third content of a second store that the user does not follow in addition to being provided as at least one piece of first content of a first store that the user follows.

When the seller sets a target type corresponding to the content 410 to the second type, the content 410 may be displayed only on a content screen (e.g., a recommended store board area in a third area 705 of FIG. 7A) targeting only new friends. The content 410 may be provided only as third content of a second store that the seller does not follow.

In addition, when the seller sets a target type corresponding to the content 410 to the third type, the content 410 may be displayed only on a content screen (e.g., "MY store board" area) targeting only existing friends. The content 410 may be provided only as first content of a store that the user follows. In this case, a selection window in the category setting area 433 that sets a category may be deactivated. Depending on an embodiment, when a target type is set to the third type, but the number of existing friends is less than a selected (or predetermined) number (e.g., 10), the server may display the content 410 on all content screens of the IMS platform in addition to the store platform as in the case in which a target type is set to the first type.

When the seller does not set a separate target type in the target setting area 431, the first type may be set to a default value.

For example, selection windows 434 that set an exhibition category of the content 410 to be displayed in a common area (e.g., the common area 235 of FIG. 2 or the third area 705 of FIG. 7A) such as a popular store board area or a recommended store board area may be displayed in the category setting area 433. The seller may select the major classification of the category and the detailed classification belonging to each major classification through the selection windows 434. The exhibition category selected by the seller through the selection windows 434 may be reflected in an exhibition area of a content screen (e.g., the content screen 230 of FIG. 2) provided by the store platform. In addition, the exhibition category selected by the seller through the selection windows 434 may be reflected in the shopping screen of the IMS.

When the seller selects the first type or the second type in the target setting area 431, the selection windows 434 of the category setting area 433 may be activated. When the seller selects the third type in the target setting area 431, the selection windows 434 of the category setting area 433 may be deactivated. When the seller applies for a review without setting a category while the selection windows 434 are activated, a validation phrase, such as "Please select a category," may be displayed in a portion (e.g., at the bottom of the selection windows 434) of the category setting area 433.

When the seller selects an exhibition category that does not match the content 410 in the category setting area 433, the publication request of the content 410 may be rejected during the review process.

Selection windows 436 for setting an exhibition period may be displayed in the exhibition period setting area 435. For example, the selection windows 436 may be provided as a calendar for setting an exhibition starting date and time (an 'exhibition starting date') and an exhibition end date and time (an 'exhibition end date') of the content 410. For example, the exhibition period may be set directly by the seller through the selection windows 436. Alternatively, a selected (or predetermined) period may be automatically set to the exhibition period. For example, a default value of the exhibition starting date and time may be set to OO o'clock after 5 days based on the current date. Even when the seller opens the calendar to set an exhibition starting date and time, the seller may not select dates before the current date. For example, a default value of the exhibition end date and time may be set to OO o'clock after 8 days based on the current date. Even when the seller opens the calendar to set an exhibition end date and time, the seller may not select dates before the exhibition starting date and time. When the time interval between the exhibition end date and time and the exhibition starting date and time set by the seller exceeds a preset time (e.g., 72 hours), for example, a validation date phrase, such as "Please set the exhibition period within 3 days (72 hours)," may be displayed at the bottom of the selection windows 436.

When the seller selects a "temporary save" button 437 displayed on the setting screen 430, the server may temporarily save values set in each area of the setting screen 430. For example, it may be assumed that the seller sets an exhibition period in the exhibition period setting area 435 and then selects the "temporary save" button 437. Here, when the previously set starting date and time of the exhibition period is 5 days or later based on the current date, the server may display the exhibition period as the previously set exhibition period. For example, when the previously set starting date and time of the exhibition period is within 5 days based on the current date or before the current date, the server may automatically change the exhibition period. The server may set the exhibition starting date and time to OO o'clock after 5 days based on the current date and may set the exhibition end date and time to OO o'clock after 8 days based on the current date.

The seller may apply for a review of the publication registration of the content 410 to the server of the store platform by selecting a "review application" button 439 displayed on the setting screen 430. A seller center may review the content 410. As the review is completed, the server may automatically display the content 410 for each exhibition area included in a content screen provided by the store platform according to an exhibition period corresponding to corresponding content.

FIG. 5 is a diagram illustrating a method of recommending at least one piece of second content, according to an embodiment. FIG. 5 illustrates a diagram 500 for describing a method of recommending at least one piece of second content that satisfies a selected (or predetermined) condition based on information set corresponding to at least one piece of first content published by a first store, according to an embodiment.

For example, a target type set corresponding to content ('first content') published by a first store of company A opened in the store platform may be the first type or the second type including new friends, an exhibition category corresponding to the first content may be "digital/home appliances>mobile phones/accessories," and an exhibition starting date of the first content may be "January 1, 10 o'clock."

In this case, the server may determine whether pieces of content ('pieces of third content') of second stores corresponding to a channel that is not included in the friend list of the user account satisfy the selected (or predetermined) condition in the IMS. The server may identify whether the pieces of third content are preset to be displayed together with the first content, that is, whether a target type corresponding to the pieces of third content is set to the first type or the second type. The server may select, among the pieces of third content of which the target type is set to the first type or the second type, pieces of third content having the same exhibition category (e.g., "digital/home appliances>mobile phones/accessories") as the first content. The server may recommend pieces of third content of which an exhibition period is not ended among the pieces of third content having the same exhibition category as the first content.

For example, it may be assumed that pieces of content published by stores corresponding to each of company S, company L, and company D satisfy the selected (or predetermined) condition described above. Accordingly, the server selects these pieces of content to recommend. Hereinafter, for case of description, the stores corresponding to each of the company S, the company L, and the company D may be simply referred to as the 'stores of the companies S, L, and D' or the 'company S's store,' the 'company L's store,' and the 'company D's store.'

The server may determine a display priority of pieces of content published by the stores of the companies S, L, and D according to the latest order of exhibition starting dates of the pieces of content published by the stores of the companies S, L, and D. The exhibition starting date of content published by the company S's store and content published by the company L's store may be the same as January 2, 10 o'clock, and the exhibition starting date of content published by the company D's store may be January 2, 14 o'clock. In this case, the server may display, as a top priority, the content published by the company D's store with the latest exhibition starting date. Here, the exhibition starting date of the content published by the stores of the companies S and L is the same as January 2, 10 o'clock, so the server may determine a display priority based on the cumulative views of each of the pieces of content published by the stores of the companies S and L in a selected (or predetermined) time (e.g., the last hour). The cumulative views of the content published by the company S's store is 10 views and the cumulative views of the content published by the company L's store is 100 views, so the server may display, as a second priority, the content published by the company S' store of which the cumulative views are low in the last hour and may display, as a third priority, the content published by the company L' store.

Figure 6:
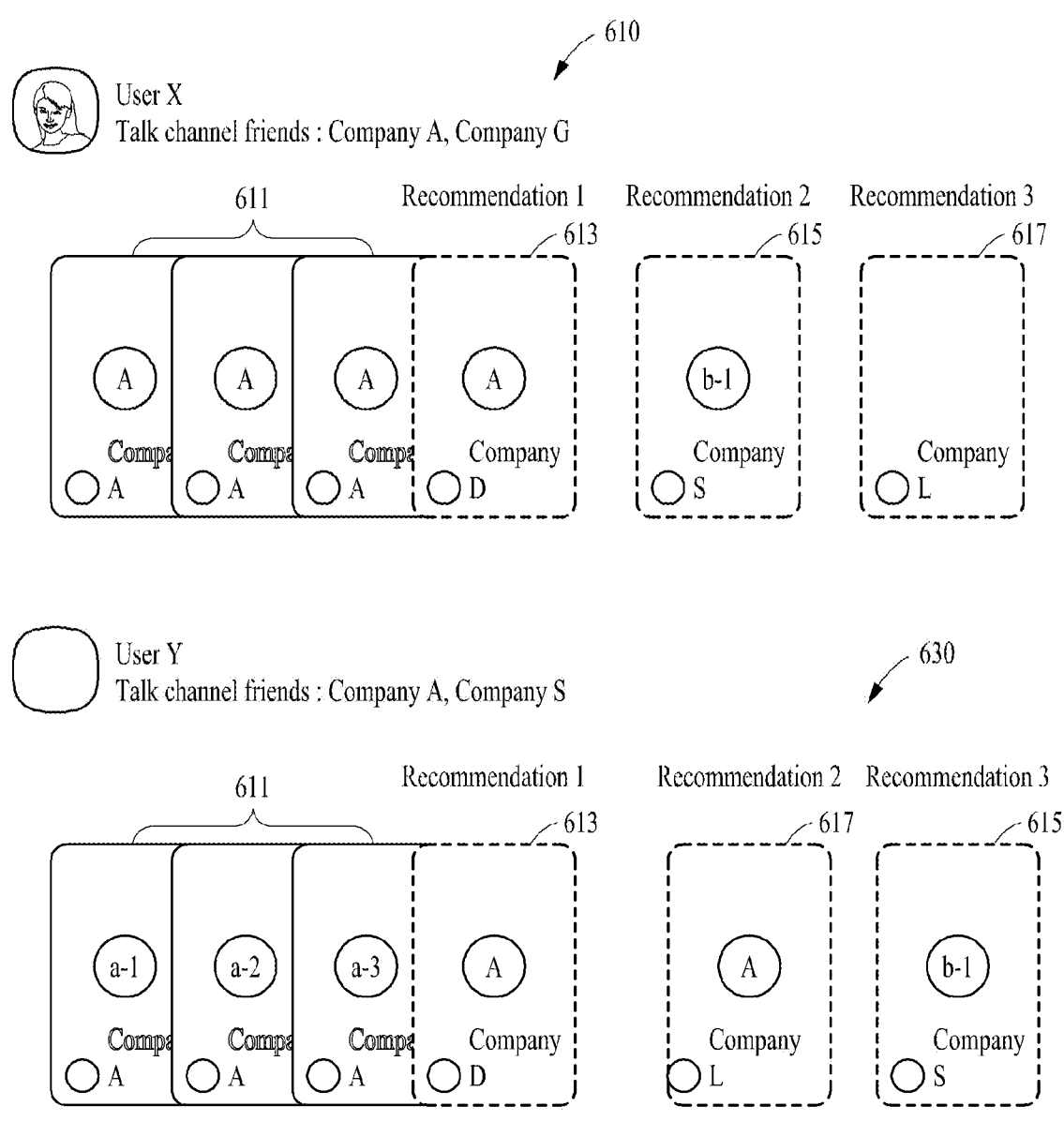
FIG. 6 is a diagram illustrating a method of recommending at least one piece of second content, according to an embodiment.

FIG. 6 is a diagram illustrating a method of recommending at least one piece of second content, according to an embodiment. FIG. 6 illustrates a screen 610 showing the order of displaying pieces of content recommended by the server for user X and a screen 630 showing the order of displaying pieces of content recommended by the server for user Y, according to an embodiment.

The screen 610 may represent the order of displaying pieces of content recommended by the server for the user X who adds company A to the friend list of the user account as a friend in the IMS. As described above with reference to FIG. 5, three pieces of first content 611 published by a company A's store, content 613 published by a company D's store, content 615 published by a company S's store, and content 617 published by a company L's store may be displayed sequentially. For example, when there are three pieces of content 613, three pieces of content 615, and three pieces of content 617, respectively, three pieces of content published by the company D's store may be displayed, three pieces of content published by the company S's store may be displayed, and then three pieces of content published by the company L's store may be displayed sequentially.

The screen 630 may represent the order of displaying pieces of content recommended by the server for the user Y who adds the company A and the company S to the friend list of the user account as friends in the IMS. When the user Y adds the company S to the friend list as a friend in addition to the company A, after the three pieces of first content 611 published by the company A's store and the content 613 published by the company D's store are displayed, the content 617 published by the company L's store may be preferentially displayed rather than the content 615 published by the company S's store. The content 615 published by the company S's store may be displayed after the content 617 published by the company L's store is displayed.

Even when the display order of pieces of content is determined as the process described above with reference to FIG. 5, the server may change the display order of pieces of content according to whether a corresponding user has a friend relationship with a second store in the IMS, that is, whether a corresponding store is a store of a business friend added to the friend list of the user account as a friend.

Figure 7B:
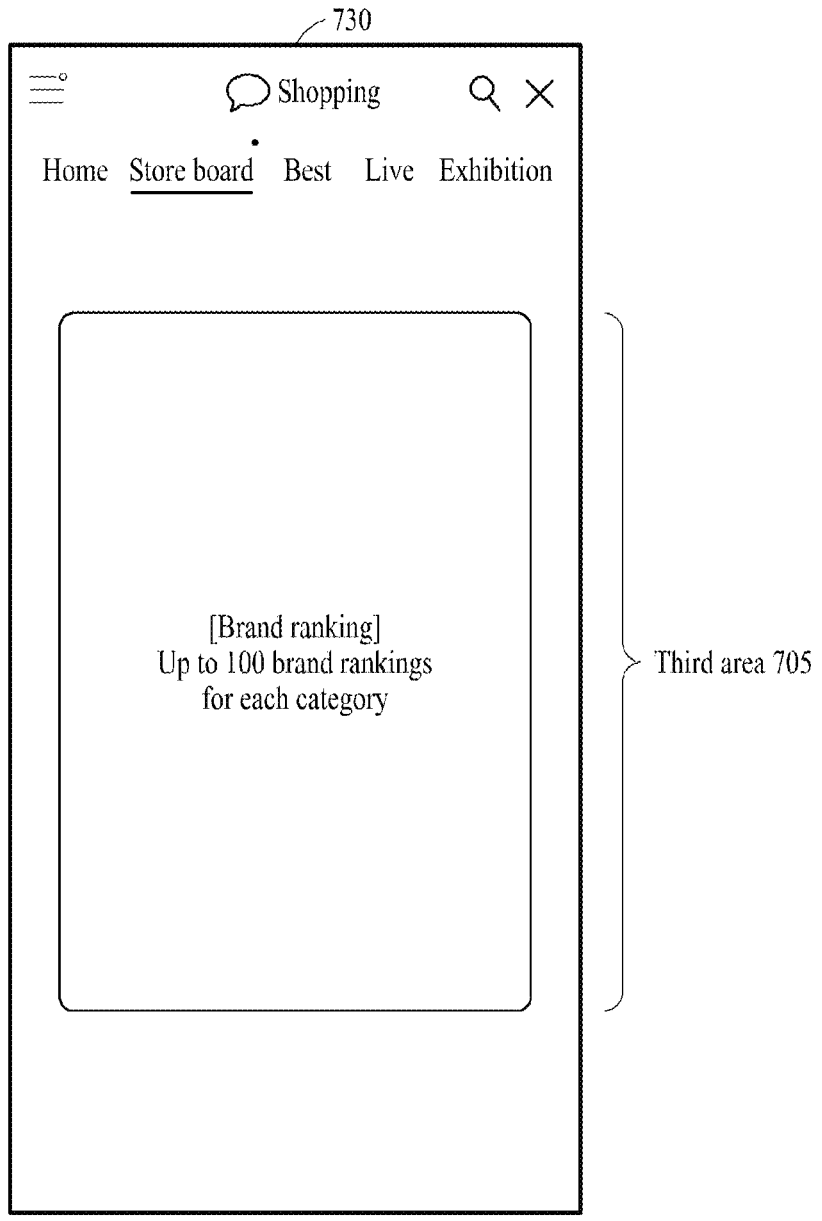

FIGS. 7A and 7B are diagrams illustrating an example of a configuration of a store board screen provided through the store platform, according to an embodiment. FIG. 7A illustrates a store board screen 710 displayed through the IMS when content of a store that the user follows exists in the store platform, according to an embodiment. FIG. 7B illustrates a store board screen 730 when content that is being exhibited does not exist.

The store board screen 710 of FIG. 7A may include, for example, a first area 701 that displays at least one piece of first content that is being exhibited, a second area 703 that displays an exhibition category of pieces of content, and the third area 705 that displays at least one of at least one piece of second content recommended by the exhibition category, and new product content (e.g., a new product board), popular content (e.g., a popular board), coupon content (e.g., a coupon board), and a brand ranking for each exhibition category.

The first area 701 may be referred to as "MY board area." The second area 703 may be referred to as a "category tab area." The third area 705 may be referred to as a "tab sub-content display area."

The server may differently configure pieces of content displayed in the first area 701 of the store board screen 710 depending on whether the user logs in and/or at least one piece of first content (e.g., a store board) published by a first store that the user follows exists. When the user logs in to the store platform, the server may display, in the first area 701, first content that is currently being exhibited among pieces of first content of the first store that the user follows. When the user is in a non-logged-in status in which the user does not log in to the store platform, it may be difficult to recommend appropriate content to the user because the server does not know personal information related to the user. Accordingly, when the user is in the non-logged-in status, the server may display the popular board in the first area 701 instead of recommending content. When the at least one piece of first content published by the first store does not exist, the server may display the popular board in the first area 701 as in the non-logged-in status.

Depending on an embodiment, when the at least one piece of first content published by the first store that the user follows does not exist or there is no first content (the store board) that is being exhibited among the pieces of first content published by the first store, the server may not display the first area 701 and the second area 703 but only the third area 705, as shown in the store board screen 730 of FIG. 7B.

Depending on whether the user logs in, in the third area 705, only content displayed in a common area may be displayed, or the content displayed in the common area and content displayed in a personalized area may be displayed together. For example, when the user is in a logged-in status, the new product board and the popular board displayed in the common area may be displayed together in the third area 705 in addition to the recommended board for each category displayed in the personalized area. Alternatively, when the user is in the non-logged-in status, the new product board and the popular board displayed in the common area may be displayed in the third area 705.

The server may display a read and/or unread mark or an N badge for content that the user does not view for each area (the common area and the personalized area).

Figure 8:
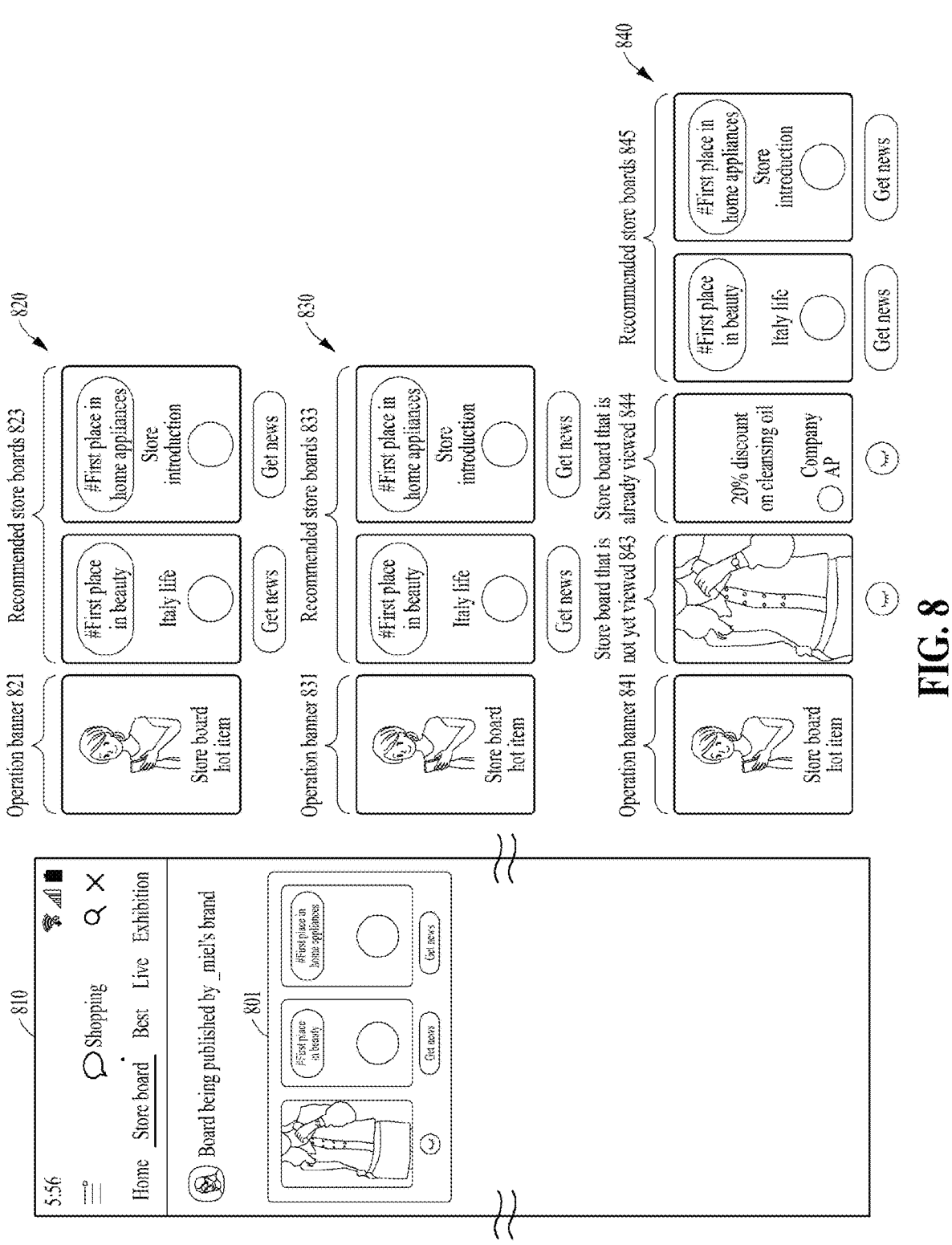
FIG. 8 is a diagram illustrating a method of determining a display order of pieces of content displayed in a first area of a store board screen, according to an embodiment.

FIG. 8 is a diagram illustrating a method of determining a display order of pieces of content displayed in a first area of a store board screen, according to an embodiment. FIG. 8 illustrates diagrams 820, 830, and 840 in which a display order of store boards is adjusted differently for each case in a first area 801 of the store board screen 810, according to an embodiment. The first area 801 may be, for example, the personalized area 231 described above with reference to FIG. 2.

When pieces of content are displayed in the first area 801 of the store board screen 810, the server may determine, for example, the display order of pieces of content displayed in the first area 801 based on at least one of whether the user subscribes to the store platform, whether a first store is a store corresponding to a channel included in the friend list of the user account in the IMS, whether content that is being exhibited in the first store exists, and whether the number of pieces of content that is being exhibited is less than or equal to a selected (or predetermined) number (e.g., 3 pieces of content).

For example, when the user does not subscribe to the store platform or the first store that the user follows does not exist in the store platform (a 'first case'), the server may determine the display order of pieces of content so that an operation banner 821 of an operator and pieces of recommended content (e.g., recommended store boards 823) are displayed sequentially, as shown in the diagram 820. Here, two recommended store boards 823 are shown in the diagram 820, but in addition to the recommended store boards 823, pieces of recommended content may be further displayed, one for each category, up to a preset maximum number (e.g., 7 pieces of recommended content).

When the user subscribes to the store platform, the first store that the user follows exists in the store platform, and content that is being exhibited in the first store does not exist (a 'second case'), the server may determine a display order so that an operation banner 831 of an operator and pieces of recommended content (recommended store boards 833) are displayed sequentially, as shown in the diagram 830. Two recommended store boards 833 are shown in the diagram 830, but in addition to the recommended store boards 833, pieces of recommended content may be further displayed, one for each category, up to a preset maximum number (e.g., 7 pieces of recommended content).

In addition, as shown in the diagram 840, the server may determine a display order so that an operation banner 841 of an operator, content 843 that the user does not view, content 844 that the user has already viewed, and pieces of recommended content (recommended store boards 845) are displayed sequentially. Likewise, the recommended store boards 845 may include pieces of recommended content, one for each category, up to a preset maximum number (e.g., 7 pieces of recommended content). Here, two recommended store boards 845 are shown in the diagram 840, but in addition to the recommended store boards 845, pieces of recommended content may be further displayed, one for each category, up to a preset maximum number (e.g., 7 pieces of recommended content).

For example, when the user subscribes to the store platform, the first store that the user follows exists in the store platform, and pieces of content that are being exhibited in the first store exist to be less than or equal to a selected (or predetermined) number (e.g., 3 pieces of content) (a 'third case'), the server may determine a display order so that an operation banner of an operator and content that is being exhibited in channel units are displayed, and pieces of recommended content of brands are displayed sequentially, one for each category, up to a preset maximum number (e.g., 7 pieces of recommended content), as shown in the diagram 840.

When the user subscribes to the store platform, the first store that the user follows exists in the store platform, and pieces of content that are being exhibited in the first store exist by exceeding a selected (or predetermined) number (e.g., 3 pieces of content) (a 'fourth case'), the server may determine a display order so that an operation banner of an operator and pieces of content that are being exhibited in store units are displayed sequentially up to a preset second maximum number (e.g., 30 pieces of content). The server may display pieces of content in the first area 801 according to the display order determined through the process described above.

In addition, when pieces of content are displayed, the server may determine whether pieces of content that are not displayed to the user exist, that is, pieces of content that the user has not yet viewed exist, among pieces of content published by the first store and being exhibited. According to the determination that pieces of content that are not displayed to the user exist, the server may sequentially display, in the first area 801, among pieces of undisplayed content, the pieces of undisplayed content of the first store that publishes content with the latest exhibition starting date.

Figure 9B:
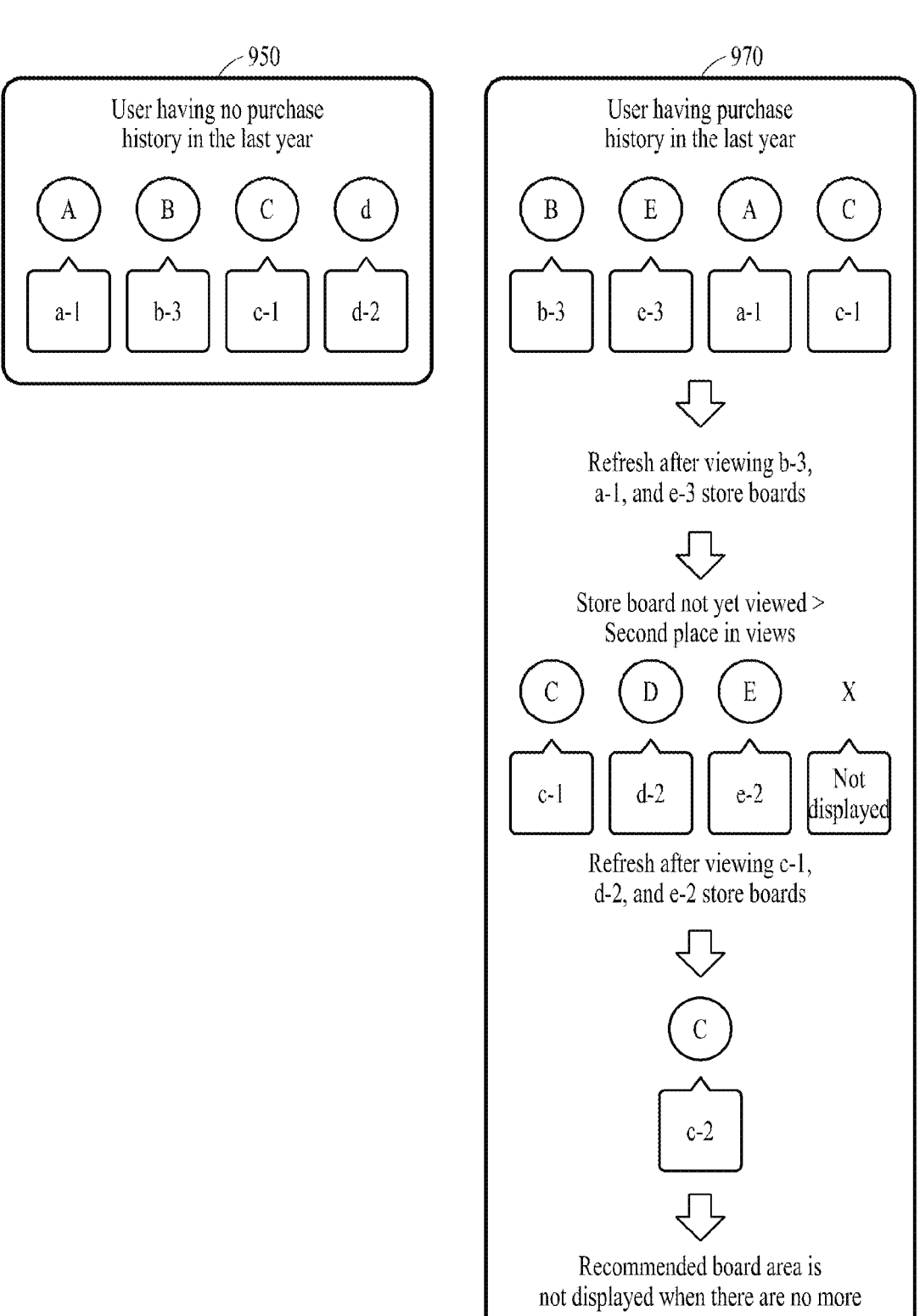

FIGS. 9A and 9B are diagrams illustrating a method of recommending at least one piece of second content to be displayed in a third area of a store board screen, according to an embodiment. FIG. 9A illustrates a diagram 900 for describing a method of extracting pieces of content displayed in a third area 920 (e.g., the third area 705 of FIG. 7) of a store board screen 910, according to an embodiment.

The server may determine whether an exhibition category of at least one piece of second content matches an exhibition category displayed in the third area 920. When it is determined that the exhibition category of the at least one piece of second content matches the exhibition category displayed in the third area 920, the server may extract, among the at least one piece of second content, pieces of third content of second stores corresponding to a channel that is not included in the friend list of the user account in the IMS. The server may filter third content that is not displayed to the user from among pieces of third content. The server may recommend the third content that is not displayed to the user as the at least one piece of second content to be displayed in the fourth area.

For example, the server may determine a display priority of the recommended at least one piece of second content, based on whether a product category of the recommended at least one piece of second content belongs to a product category having a purchase history of the user in a selected (or predetermined) period (e.g., one year) and a ranking of views of the recommended at least one piece of second content for a selected (or predetermined) time (e.g., the last hour). The server may display the recommended at least one piece of second content in the third area 920 according to the determined display priority.

A process of extracting content to be recommended by the server is described with reference to a diagram 930.

For example, it may be assumed that an exhibition category of content currently being displayed in the fourth area is "beauty." In this case, the server may remove pieces of content (e.g., a-2, a-3, b-1, b-2, c-3, d-1, d-3, e-1, f-1, f-2, f-3, g-1, g-2, and g-3) that user Z has already viewed from among pieces of content of which the exhibition category matches "beauty," may filter (select) pieces of content that are not displayed to the user, and may recommend the pieces of content as at least one piece of second content to be displayed in the fourth area. More specifically, the server may extract, as display targets, among the pieces of content of which the exhibition category is "beauty," pieces of content (e.g., a-1, b-3, c-1, c-2, d-2, e-2, and e-3) of stores (e.g., A, B, C, D, E, F, and G) corresponding to a channel that is not included in a friend list of the user Z's account in the IMS. Here, the pieces of content (e.g., a-1, b-3, c-1, c-2, d-2, e-2, and e-3) extracted by the server may correspond to pieces of content that are currently being exhibited. When an exhibition category of corresponding content among pieces of content does not correspond to "beauty" or the user Z has already viewed the corresponding content, the server may exclude the corresponding content from a recommended target. The server may select one piece of content with the highest number of views within the last hour for each category for the pieces of content (a-1, b-3, c-1, c-2, d-2, e-2, and e-3). The server may sort pieces of content (a-1, b-3, c-1, d-2, and e-3) selected one by one for each category according to their ranking of views.

Here, when the pieces of content (a-1, b-3, c-1, d-2, and e-3) do not belong to the product category having the purchase history of the user Z in a selected (or predetermined) period (e.g., one year), that is, when there is no purchase history of the user Z for products belonging to the product category within the last year, the server may sequentially display the pieces of content (a-1, b-3, c-1, c-2, d-2, e-2, and e-3) according to the order of the highest number of views in the last hour determined previously, as shown in a diagram 950.

In contrast, when the pieces of content (a-1, b-3, c-1, d-2, and e-3) belong to the product category having the purchase history of the user Z in a selected (or predetermined) period (e.g., one year), the server may change the display order of pieces of content by considering the purchase history of the user Z, as shown in a diagram 970. The server may determine the display priority of pieces of content based on the ranking of views for a selected (or predetermined) time (e.g., the last hour) among pieces of content (b-3 and e-3) belonging to the product category having the purchase history of the user Z. For example, among the pieces of content (b-3 and e-3), when the number of views of the content (b-3) is higher than the number of views of the content (e-3) in an hour, the server may preferentially display the content (b-3) having a higher number of views, may display the content (e-3), and may then sequentially display the remaining pieces of content (a-1, c-1, and d-2) according to the original display order. Here, when the user Z 'refreshes' after viewing the pieces of content (b-3, a-1, and e-3), the server may adjust the ranking views of content(s) that the user Z has not yet viewed to the second priority. The server may display pieces of content (c-1, d-2, and c-2), and when the user Z 'refreshes' after viewing the pieces of content (c-1, d-2, and e-2), the server may display the remaining piece of content (c-2). When there is no more content to be displayed, the server may not display the fourth area.

For example, when the user Z is a non-logged-in user or when it is not known whether the user Z adds a corresponding store, the server may not display pieces of content in the third area 920. The number of pieces of content displayed in the third area 920 may be, for example, up to 30 but is not necessarily limited thereto.

Figure 10C:
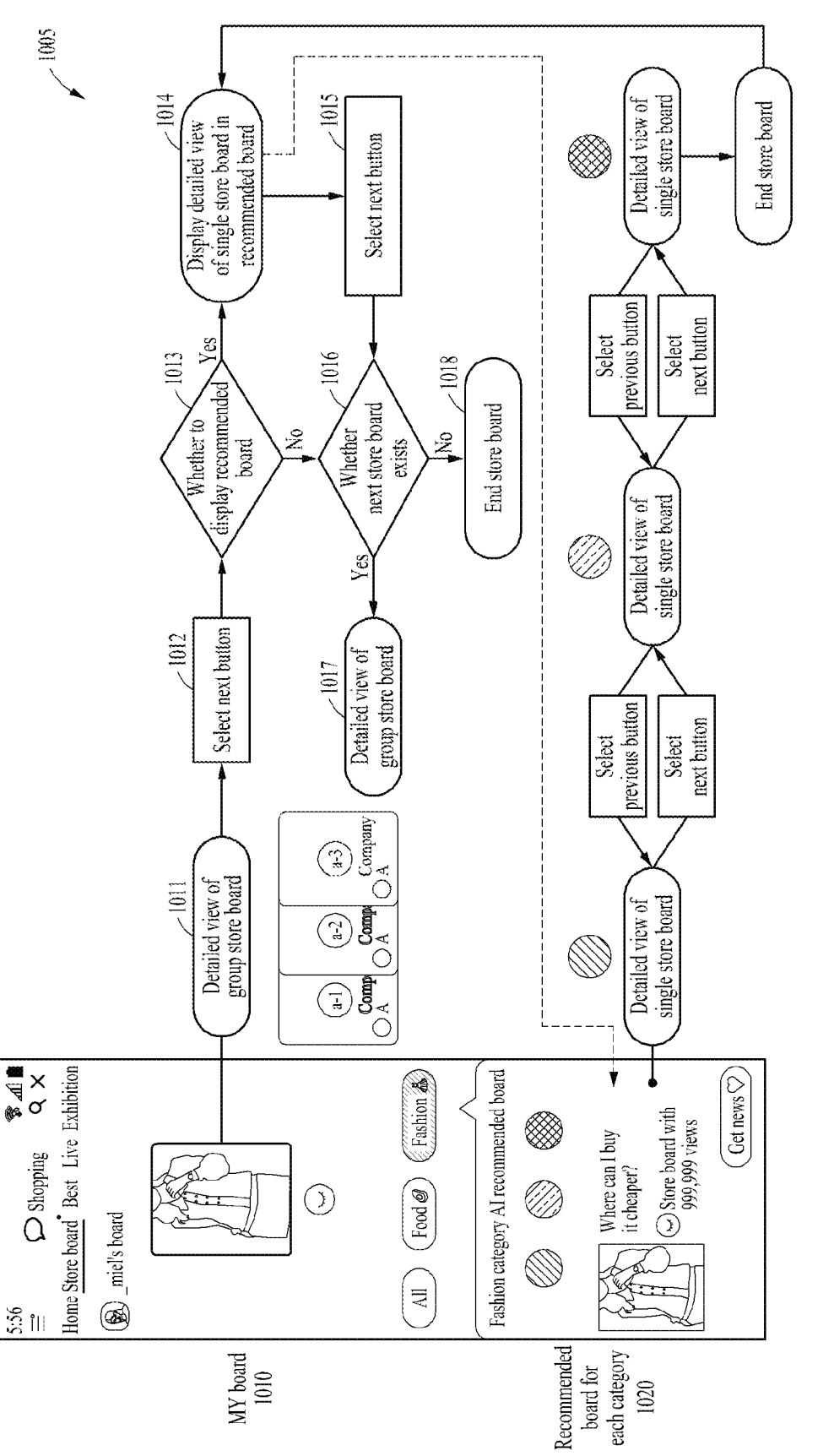

FIGS. 10A to 10C are diagrams illustrating a method of displaying one piece of content or a group of pieces of content for each area of a store board screen, according to an embodiment.

When pieces of content are displayed, the server may display the pieces of content in the listing order of stores for each area of a store board screen and may display the pieces of content in the oldest order of exhibition starting dates of the pieces of content in one store. Here, the server may preferentially display second content that is not displayed to the user among pieces of second content for each area of the store board screen. The server may vary a method of displaying the pieces of content according to the type of content.

FIG. 10A illustrates a diagram 1001 for describing a display order of pieces of content and a method of playing the pieces of content when the type of content is group content, according to an embodiment.

For example, the type of content may correspond to a group of pieces of content published by the same store, that is, group content. The server may determine whether the group content is published by the same store (e.g., a first store), and when the group content is published by the same store, the server may display pieces of content published by a corresponding store up to 3 pieces of content for each store.

Here, the group content may be displayed in a first area of a content screen, and the display order of the group content may be displayed sequentially according to the listing order of stores. Here, pieces of content belonging to the group content may be displayed sequentially in one store according to the oldest order of the exhibition starting dates of the pieces of content. When the user enters the content screen, the server may play content that the user does not view among pieces of group content of a corresponding store. For example, when the user has already viewed content (a-1) among pieces of group content (a-1, a-2, and a-3), the server may play content (a-2) that is the next content of the content (a-1).

For example, when the pieces of group content (a-1, a-2, and a-3) of store A and pieces of group content (b-1, b-2, and b-3) of store B exist, the server may sequentially display pieces of group content of a corresponding store according to the listing order of each store. When the store A is listed before the store B, the server may display all pieces of group content (a-1, a-2, and a-3) of the store A and then may display the pieces of group content (b-1, b-2, and b-3) of the store B. Here, the user may move between each piece of group content through a swiping operation.

The pieces of group content may be displayed, for example, in a personalized area of the content screen.

FIG. 10B illustrates a diagram 1003 for describing a display order of pieces of content when the type of content is a piece of single content, according to an embodiment.

When the type of content is a piece of single content, the server may display pieces of single content one by one based on ID information of each piece of content. The pieces of single content may be sequentially displayed in the listing order of each of pieces of single content. For example, pieces of single content (a-1 and a-3) of the store A, pieces of single content (b-1 and b-2) of the store B, and single piece of content (c-1) of store C may exist. Here, when the listing order of each of pieces of single content is content (a-1), content (b-1), content (b-2), content (a-3), and content (c-1), the server may sequentially display pieces of single content according to the listing order. For example, a piece of single content may be displayed in a common area of the content screen, such as a recommended board, a new product board, a popular board for each category, and a coupon board area.

FIG. 10C illustrates a diagram 1005 for describing a method of displaying group content in a first area (e.g., a MY board area 1010) and displaying a piece of single content in a fourth area (e.g., a recommended board area for each category 1020), according to an embodiment.

In operation 1011, for example, when the user selects a representative image of the group content of the store A displayed in the MY board area 1010, the server may display a detailed view of pieces of group content (a-1, a-2, and a-3). In operation 1012, when the user who has viewed all pieces of displayed group content (a-1, a-2, and a-3) selects the next button, in operation 1013, the server may determine whether to display a recommended board. In operation 1011, for example, the server may determine whether to display the recommended board based on whether there is a store board with a targeting target set to 'including new friends,' among store boards having the same category as the store board and being exhibited.

In operation 1016, the server may determine whether next group content to be displayed in the MY board area 1010 exists when it is determined not to display the recommended board in operation 1013. In operation 1017, the server may display a detailed view of the next group content when the next group content exists in operation 1016. In operation 1018, the server may end displaying content when the next group content does not exist in operation 1016.

In operation 1014, the server may display a detailed view of a piece of single content in the recommended board when it is determined to display the recommended board in operation 1013. Here, the detailed view of the piece of single content in the recommended board may be displayed in the recommended board area for each category 1020. The user may view a piece of previous or next single content by pressing the previous or next button for each piece of single content displayed in the recommendation board area for each category 1020. When the user who has viewed all pieces of single content displayed in the recommendation board area for each category 1020 selects the next button as in operation 1015, in operation 1016, the server may determine that the next group content to be displayed in the MY board area 1010 exists. In operation 1017, the server may display the detailed view of the next group content when the next group content exists in operation 1016. In operation 1018, the server may end displaying content when the next group content does not exist in operation 1016.

Figure 11A:
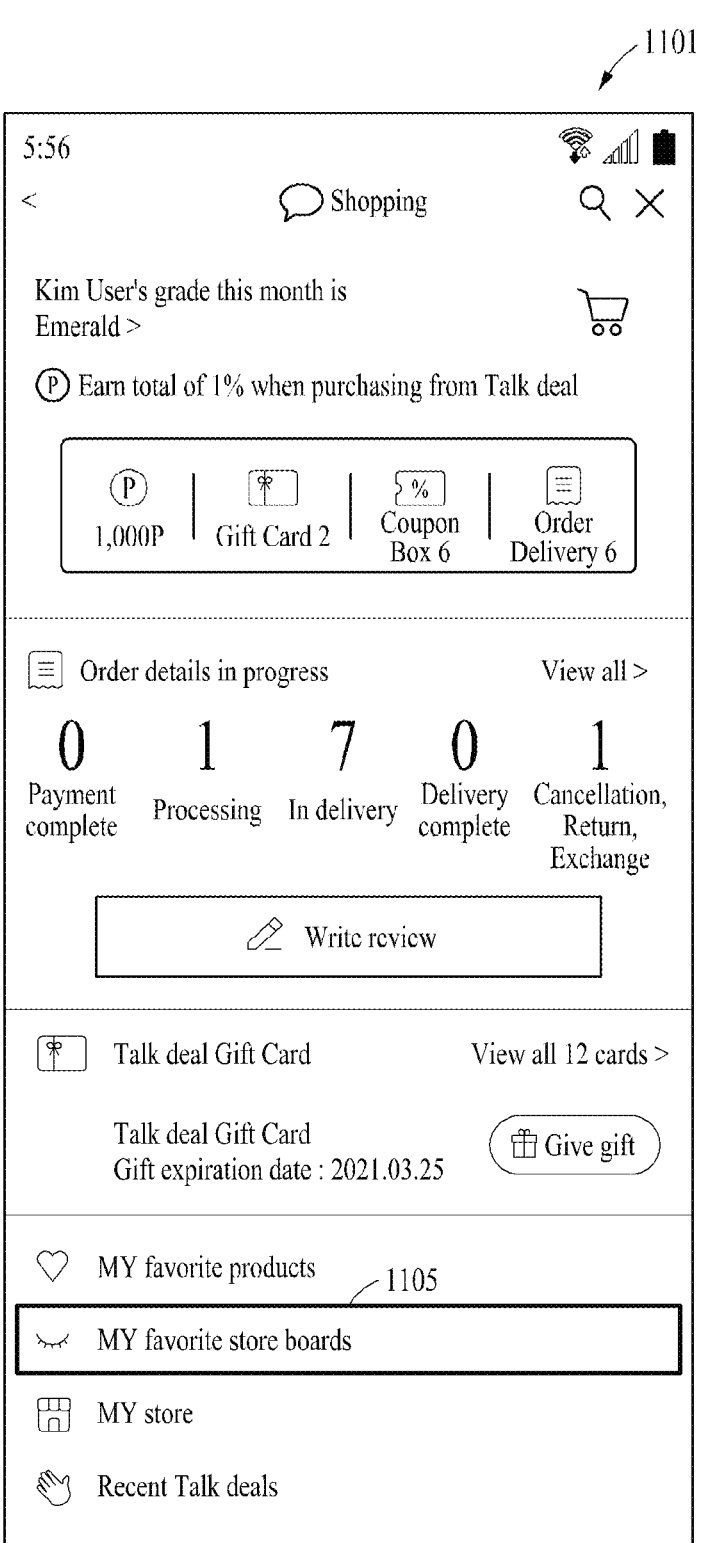
FIGS. 11A to 11C are diagrams illustrating a method of displaying content selected by a user among pieces of content displayed through a store platform, according to an embodiment.
Figure 11B:
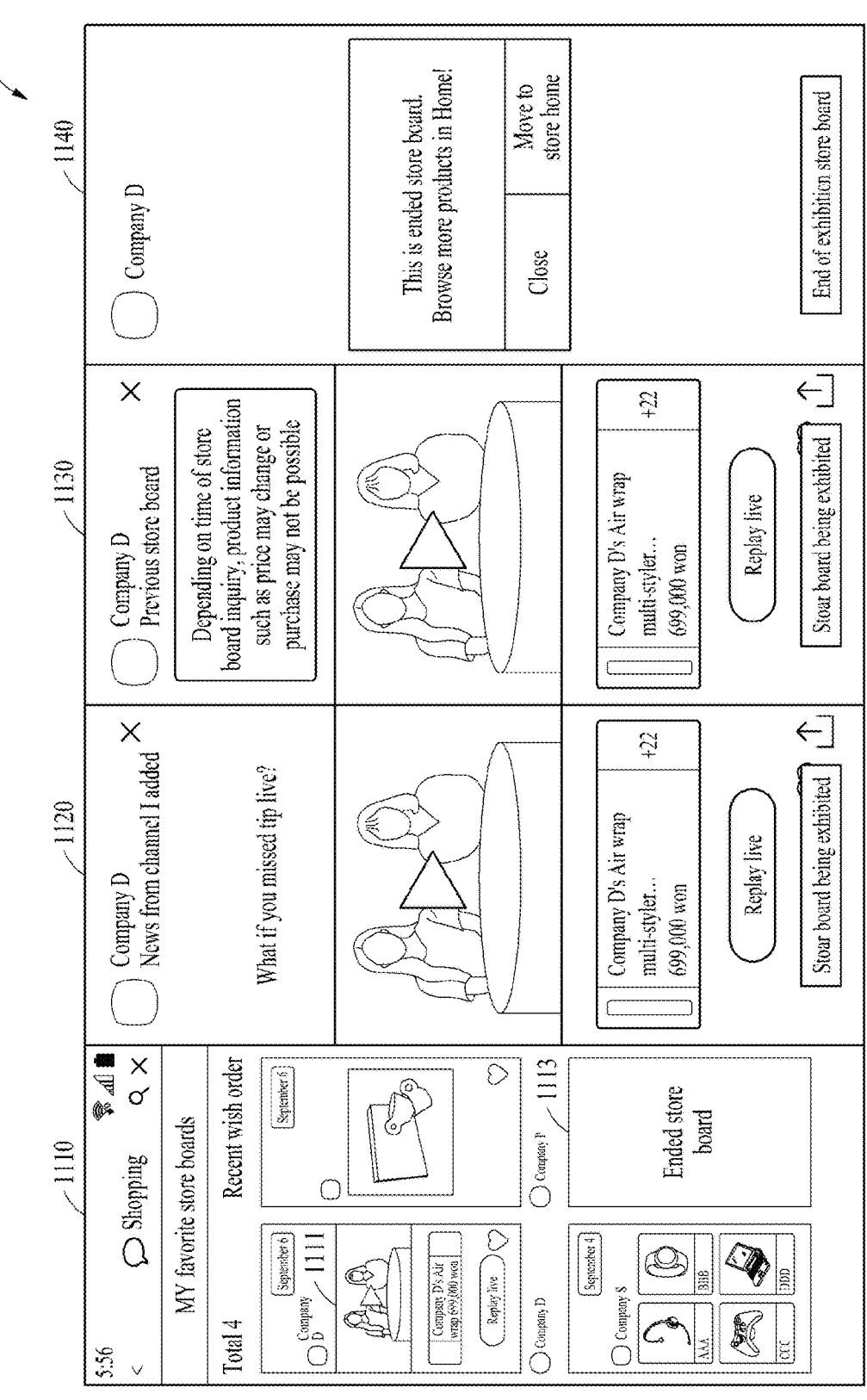
Figure 11C:
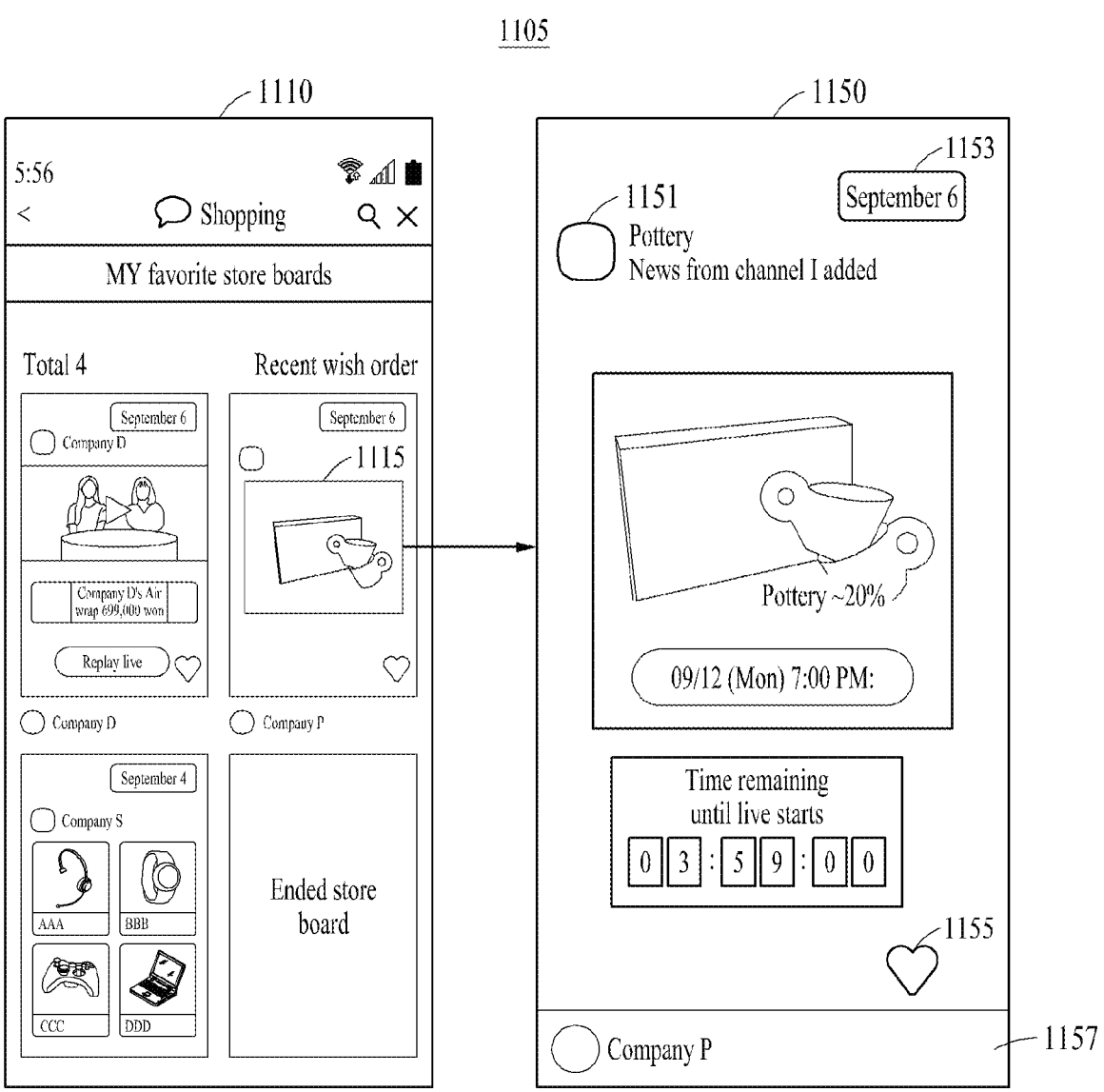

FIGS. 11A to 11C are diagrams illustrating a method of displaying content selected by the user among pieces of content displayed through the store platform, according to an embodiment.

FIG. 11A illustrates a diagram 1101 showing a menu 1105 on a content screen in MY home screen of the messaging platform, according to an embodiment. The menu 1105 on the content screen may be displayed with the menu name "MY favorite store boards." An N badge corresponding to the number (N) of pieces of content selected by the user may be displayed in the menu name "MY favorite store boards." When the user selects the menu 1105 on the content screen, the content screen may be switched to a landing screen 1110 provided by the store platform.

FIG. 11B illustrates a diagram 1103 showing screens 1120, 1130, and 1140 that move in the landing screen 1110 provided by the store platform when the user clicks the menu 1105 on the content screen, according to an embodiment.

The landing screen 1110 may correspond to a page of MY favorite store boards.

A title bar, "MY favorite store boards," may be displayed fixedly at the top of the landing screen 1110. When the user clicks a close button in a detailed view of the store board, a previous page of MY favorite store boards may be displayed. All store boards selected (wished) by the user may be displayed in the page of MY favorite store boards, which is the landing screen 1110. Here, all store boards may include all of MY favorite store boards, regardless of status information (e.g., on exhibition, exhibition closed, exhibition suspended, and dimmed) of the store boards. For all store boards, a recently wished store board may be displayed first, and a previously wished store board may be displayed as a lower priority based on the time point when the user wishes a corresponding store board.

For example, when the user clicks a store board 1111 that is being exhibited on the landing screen 1110, a detailed view screen corresponding to the store board 1111 may be displayed, as shown in the screen 1120. A single store board may be a moving image, for example, a live video, or may be a single image (a still image). The user may display a detailed view screen for the next store board of a single store board by clicking the right tab on the single store board or a swiping operation.

The server may display store boards for each area of the store platform according to a preset exhibition period by a store or a seller corresponding to each of the store boards. For example, the server may determine whether an arbitrary store board of the store boards corresponds to a store board set to be dimmed due to the lapse of the preset exhibition period. When the arbitrary store board does not correspond to the store board set to be dimmed, the server may display a corresponding store board regardless of whether the preset exhibition period is ended, depending on the selection ('wish') of the user.

For example, the exhibition of the store board 1111 that is being exhibited on the landing screen 1110 may be ended or suspended. When the user selects (clicks) a store board displayed on the landing screen 1110, the server may determine whether the store board corresponds to content that is dimmed due to the lapse of the preset exhibition period. For example, when the store board 1111 does not correspond to dimmed content, the server may display the store board 1111 regardless of whether the preset exhibition period is ended, as shown in the screen 1130.

In contrast, when a store board 1113 corresponds to the content that is dimmed due to the lapse of the preset exhibition period, the server may dim the store board 1113 in the page of MY favorite store boards and may display a phrase indicating that the store board 1113 is a store board of which the exhibition is ended (e.g., "This is an ended store board. Browse more products in home!"), as shown in the screen 1140.

FIG. 11C illustrates a detailed view screen 1150 displayed as the user selects a store board 1115 displayed on the landing screen 1110 through a click operation, according to an embodiment.

A thumbnail image 1151 registered by a manager corresponding to the store board 1115 may be displayed on the detailed view screen 1150. A date 1153 when the user wishes the store board 1115 may be displayed on the detail view screen 1150. The date 1153 when the user wishes the store board 1115 may be displayed in the form of, for example, MM DD.

For example, a heart-shaped wish button 1155 may be displayed on the detailed view screen 1150. When the user clicks the heart-shaped wish button 1155, a wished status of content currently in the wished status may be released and the store board 1115 may be excluded from the wish list. Accordingly, 1 may be subtracted from the 'number of store boards' displayed on the landing screen 1110.

In addition, store information 1157 corresponding to the store board 1115 may be displayed on the detailed view screen 1150. The store information 1157 may include, for example, a profile image and a store name of a store that publishes a corresponding store board. When the user clicks the store information 1157 or the store name, the user may move to the home page of a corresponding store. When the user identifies the web view of the store board 1115 and returns to the page of 'MY favorite store boards,' the server may refresh and display the whole page of MY favorite store boards.

Figure 12:
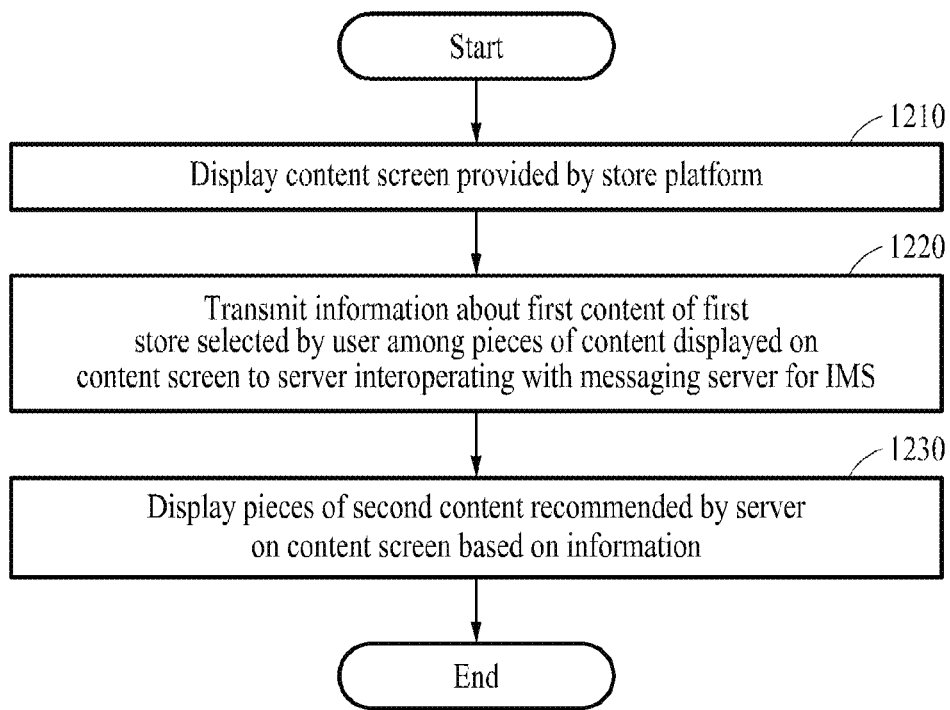
FIG. 12 is a flowchart illustrating an operating method of a terminal, according to an embodiment.

FIG. 12 is a flowchart illustrating an operating method of a terminal according to an embodiment. Operations to be described hereinafter may be performed sequentially but not necessarily. For example, the order of the operations may change and at least two of the operations may be performed in parallel.

Referring to FIG. 12, in operation 1210, a terminal may display a content screen provided by the store platform (the online platform). The online platform may interoperate through a channel for the IMS. Here, the content screen may include pieces of content of stores opened in the store platform. More specifically, the content screen may include, for example, but is not necessarily limited thereto, at least one of a first area that displays at least one piece of first content that is being exhibited, a second area that displays an exhibition category of pieces of content, and a third area that displays at least one of second content recommended for each exhibition category, and new product content, popular content, and coupon content for each exhibition category.

In operation 1220, the terminal may transmit information about first content of a first store selected by the user among pieces of content displayed on the content screen in operation 1210 to the server interoperating with the messaging server for the IMS. The information about the first content of the first store may include, for example, but is not necessarily limited thereto, ID information about the first store and/or ID information related to an exhibition category corresponding to the first content.

In operation 1230, the terminal may display pieces of second content recommended by the server on the content screen based on the information received in operation 1220. Here, the pieces of second content may be determined (recommended) by whether a selected (or predetermined) condition is satisfied, in which the selected (or predetermined) condition may include at least one of whether category information of at least one piece of second content is associated with at least one of the first store and the first content and whether a channel interoperating with each of second stores is a channel included in the friend list of the user account in the IMS provided through the messaging server. Here, the at least one piece of second content may be published by at least one second store among the second stores in the online platform.

Figure 13:
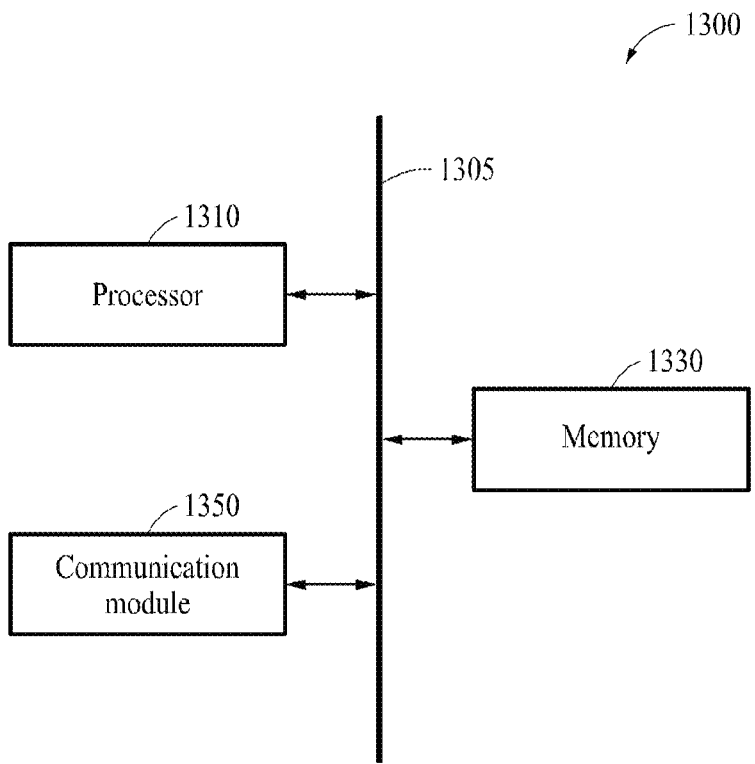
FIG. 13 is a block diagram illustrating a server according to an embodiment.

FIG. 13 is a block diagram illustrating a server according to an embodiment.

Referring to FIG. 13, the server 1300 according to an embodiment may include a processor 1310, a memory 1330, and a communication module 1350. The processor 1310, the memory 1330, and the communication module 1350 may communicate with each other via a communication bus 1305. The server 1300 may recommend content by communicating with the messaging server.

The processor 1310 may obtain first content published by a first store selected by the user in the store platform (the online platform). Here, the online platform may interoperate through a channel for the IMS. In response to obtaining the first content, the processor 1310 may recommend second content that satisfies a selected (or predetermined) condition. The selected (or predetermined) condition may include, for example, at least one of whether category information of at least one piece of second content is associated with at least one of the first store and at least one piece of first content and whether a channel interoperating with each of second stores is a channel included in the friend list of the user account in the IMS provided through the messaging server. Here, the at least one piece of second content may be published by at least one second store among the second stores in the online platform.

The processor 1310 may display pieces of content including the first content and pieces of second content.

The processor 1310 may determine at least one second store among the second stores to recommend the pieces of second content based on whether the channel corresponding to the second stores is a channel included in the friend list of the user account in the IMS. The processor 1310 may determine pieces of third content of the at least one second store as the pieces of second content depending on whether an exhibition category of the pieces of third content of the at least one second store matches the category information associated with at least one of the first store and the first content.

The processor 1310 may execute a program and may control the server 1300. Code of the program executed by the processor 1310 may be stored in the memory 1330.

The memory 1330 may store a variety of information generated in the processing process of the processor 1310 described above. In addition, the memory 1330 may store various types of data and programs. The memory 1330 may include a volatile memory or a non-volatile memory. The memory 1330 may include a high-capacity storage medium such as a hard disk to store a variety of data.

The communication module 1350 may transmit pieces of content including the first content and the pieces of second content to the outside of the server 1300.

In addition, the processor 1310 may perform at least one method described above with reference to FIGS. 1 to 12 or an algorithm corresponding to the at least one method. The processor 1310 may be a data-processing device implemented by hardware having a circuit of a physical structure to perform desired operations. For example, the desired operations may include code or instructions in a program. The processor 1310 may be implemented as, for example, a central processing unit (CPU), a graphics processing unit (GPU), or a neural processing unit (NPU). The server 1300 that is implemented as hardware may include, for example, a microprocessor, a CPU, a processor core, a multi-core processor, a multiprocessor, an application-specific integrated circuit (ASIC), and a field-programmable gate array (FPGA).

The embodiments described herein may be implemented using a hardware component, a software component, and/or a combination thereof. A processing device may be implemented using one or more general-purpose or special-purpose computers, such as, for example, a processor, a controller, an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is used as singular; however, one skilled in the art will appreciate that a processing device may include multiple processing elements and/or multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents. Therefore, other implementations, other embodiments, and equivalents to the claims are also within the scope of the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of recommending content, the method being performed by a server communicating with a messaging server and comprising:

obtaining at least one piece of first content published by a first store selected by a user from an online platform;

recommending at least one piece of second content that satisfies a selected condition in response to the obtaining of the at least one piece of first content; and displaying pieces of content comprising the at least one piece of first content and the at least one piece of second content, wherein the selected condition comprises whether a channel interoperating with each of second stores is a channel included in a friend list of an account of the user in an instant messaging service provided through the messaging server, wherein the at least one piece of second content is published by at least one second store among the second stores in the online platform, wherein:

the pieces of content comprise identification information related to an exhibition category corresponding to each of the pieces of content, and a content screen provided by the online platform comprises at least one of:

a first area that displays the at least one piece of first content that is being exhibited;

a second area that displays an exhibition category of the pieces of content; and a third area that displays at least one of the at least one piece of second content recommended for each of the exhibition category, and new product content, popular content, and coupon content for each of the exhibition category.

2. The method of claim 1, wherein the recommending of the at least one piece of second content comprises:

determining, among the second stores, the at least one second store to recommend the at least one piece of second content based on whether the channel interoperating with each of the second stores is the channel included in the friend list of the account of the user in the instant messaging service; and determining pieces of third content of the at least one second store to be the at least one piece of second content depending on whether an exhibition category of the pieces of third content of the at least one second store matches category information associated with at least one of the first store and the at least one piece of first content.

3. The method of claim 2, wherein the selected condition comprises at least one of:

a condition in which the second stores correspond to the same industry as the first store;

a condition in which the at least one piece of second content is being exhibited when the at least one piece of first content is displayed;

a condition in which exhibition starting dates of the at least one piece of second content take precedence; and a condition in which recent cumulative views of the at least one piece of second content are low.

4. The method of claim 3, wherein the determining of the pieces of third content of the at least one second store to be the at least one piece of second content comprises:

determining whether the pieces of third content are preset to be displayed together with the at least one piece of first content; and determining the pieces of third content to be the at least one piece of second content by further considering the selected condition for the pieces of third content according to the determination that the pieces of third content are preset to be displayed together with the at least one piece of first content.

5. The method of claim 1, wherein the recommending of the at least one piece of second content comprises, depending on whether the at least one piece of second content corresponds to another piece of content published by the first store in addition to the at least one piece of first content, determining the other piece of content to be the at least one piece of second content.

6. The method of claim 1, wherein the displaying of the pieces of content comprises:

determining a display priority of the at least one piece of second content according to a latest order of exhibition starting dates of the at least one piece of second content; and sequentially displaying the at least one piece of second content according to the determined display priority, following a display of the at least one piece of first content.

7. The method of claim 6, wherein the determining of the display priority of the at least one piece of second content comprises determining the display priority of the at least one piece of second content based on cumulative views of the at least one piece of second content in a selected time when the exhibition starting dates of the at least one piece of second content are the same.

8. The method of claim 1, wherein the displaying of the pieces of content comprises displaying a selected number of pieces of content for each of the first store and the second stores.

9. The method of claim 1, wherein the displaying of the pieces of content comprises displaying the at least one piece of first content and the at least one piece of second content for a preset time for each type of the at least one piece of first content and the at least one piece of second content.

10. The method of claim 1, wherein the displaying of the pieces of content comprises determining content to be displayed in the first area based on at least one of whether the user logs in to the online platform and whether the at least one piece of first content published by the first store exists.

11. The method of claim 1, comprising:

differently configuring default category tabs displayed in the second area according to a purchase history of the user.

12. The method of claim 1, wherein the displaying of the pieces of content comprises:

determining a display order of the pieces of content displayed in the first area based on at least one of whether the user subscribes to the online platform, whether the first store is a channel included in the friend list of the account of the user, whether pieces of content that are being exhibited in the first store exist, and whether a number of the pieces of content that is being exhibited is less than or equal to a selected number; and displaying the pieces of content on the content screen according to the determined display order.

13. The method of claim 1, wherein the displaying of the pieces of content comprises:

identifying among pieces of content published by the first store and being exhibited pieces of content not displayed to the user; and sequentially displaying, in the first area, among the identified pieces of content, one or more identified pieces of content having the latest exhibition starting dates.

14. The method of claim 1, wherein the recommending of the at least one piece of second content comprises:

determining whether category information of the at least one piece of second content matches the exhibition category displayed in the second area;

extracting, from among the at least one piece of second content, pieces of third content of second stores corresponding to a channel that is not included in the friend list of the account of the user when it is determined that the category information of the at least one piece of second content matches the exhibition category displayed in the second area;

filtering undisplayed third content to the user from among the pieces of third content; and recommending the undisplayed third content to the user as the at least one piece of second content to be displayed in the third area.

15. The method of claim 14, wherein the displaying of the pieces of content comprises:

determining a display priority of the at least one piece of second content based on whether the category information of the at least one piece of second content belongs to a product category having a purchase history of the user in a selected period and a ranking of views of the at least one piece of second content for a selected time; and displaying the at least one piece of second content in the third area according to the determined display priority.

16. The method of claim 1, wherein the displaying of the pieces of content comprises at least one of:

displaying, in the first area of the content screen, the at least one piece of second content according to the oldest order of exhibition starting dates of the pieces of content, following the at least one piece of first content, based on whether the at least one piece of second content is published by the first store; and preferentially displaying, in the first area of the content screen, undisplayed second content to the user among the at least one piece of second content.

17. The method of claim 1, wherein the displaying of the pieces of content comprises displaying the pieces of content according to a preset exhibition period by a store corresponding to each of the pieces of content.

18. The method of claim 17, wherein the displaying of the pieces of content comprises:

determining whether arbitrary content among the pieces of content corresponds to content set to be dimmed due to a lapse of the preset exhibition period; and displaying the arbitrary content regardless of whether the preset exhibition period is ended when the arbitrary content does not correspond to the content set to be dimmed.

19. A method of operating a terminal, the method comprising:

displaying a content screen provided by an online platform, wherein the content screen comprises pieces of content of stores opened in the online platform;

transmitting, among the pieces of content displayed in the content screen, information about first content of a first store selected by a user to a server interoperating with a messaging server for an instant messaging service (IMS); and displaying pieces of second content recommended by the server in the content screen based on the information, wherein the pieces of second content are determined by whether a selected condition is satisfied, and wherein the selected condition comprises:

whether a channel interoperating with each of second stores is a channel included in a friend list of an account of the user in the IMS provided through the messaging server, wherein the at least one piece of second content is published by at least one second store among the second stores in the online platform.

20. One or more memories collectively having contents configured to cause a server communicating with a messaging server to perform a method of recommending content, the method comprising:

obtaining at least one piece of first content published by a first store selected by a user from an online platform;

recommending at least one piece of second content that satisfies a selected condition in response to the obtaining of the at least one piece of first content; and displaying pieces of content comprising the at least one piece of first content and the at least one piece of second content, wherein the selected condition comprises:

whether a channel interoperating with each of second stores is a channel included in a friend list of an account of the user in an instant messaging service provided through the messaging server, wherein the at least one piece of second content is published by at least one second store among the second stores in the online platform, wherein:

the pieces of content comprise identification information related to an exhibition category corresponding to each of the pieces of content, and a content screen provided by the online platform comprises at least one of:

a first area that displays the at least one piece of first content that is being exhibited;

a second area that displays an exhibition category of the pieces of content; and a third area that displays at least one of the at least one piece of second content recommended for each of the exhibition category, and new product content, popular content, and coupon content for each of the exhibition category.

21. The method of claim 1, wherein the selected condition comprises whether category information of the at least one piece of second content is associated with one of the first store or the at least one piece of first content.

22. The method of claim 19, wherein the selected condition comprises whether category information of the at least one piece of second content is associated with one of the first store or the at least one piece of first content.

* * * * *